(12) United States Patent
Kim

(10) Patent No.: US 12,547,221 B2
(45) Date of Patent: Feb. 10, 2026

(54) HINGE ASSEMBLY AND ELECTRONIC DEVICE

(71) Applicant: Samsung Display Co., Ltd., Yongin-si (KR)

(72) Inventor: Seyong Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 296 days.

(21) Appl. No.: 18/338,216

(22) Filed: Jun. 20, 2023

(65) Prior Publication Data

US 2023/0409091 A1 Dec. 21, 2023

(30) Foreign Application Priority Data

Jun. 21, 2022 (KR) .......................... 10-2022-0075774

(51) Int. Cl.
*G06F 1/16* (2006.01)
(52) U.S. Cl.
CPC .................................. *G06F 1/1681* (2013.01)
(58) Field of Classification Search
CPC .... G06F 1/1681; G06F 1/1616; G06F 1/1652; F16C 11/04; F16C 11/103; G09F 9/301; H04M 1/022; H04M 1/0268; H04M 1/0216; H05K 5/0226
See application file for complete search history.

(56) References Cited

U.S. PATENT DOCUMENTS

| | | | | |
|---|---|---|---|---|
| 8,782,853 B2* | 7/2014 | Ge | ...................... | H04M 1/0202 248/292.12 |
| 8,854,834 B2* | 10/2014 | O'Connor | ............. | G06F 1/1681 16/334 |
| 9,665,126 B2* | 5/2017 | O'Connor | ............. | G06F 1/1681 |
| 10,231,347 B2* | 3/2019 | Seo | ...................... | E05D 11/082 |
| 11,379,013 B2* | 7/2022 | Cha | ...................... | G06F 1/1652 |
| 11,470,735 B2* | 10/2022 | Kim | ...................... | G06F 1/1681 |
| 11,543,854 B2* | 1/2023 | Park | ...................... | G06F 1/1616 |
| 11,662,779 B2* | 5/2023 | Morrison | ............... | G06F 1/1616 361/679.31 |
| 11,680,601 B1* | 6/2023 | Yao | ...................... | G06F 1/1681 16/233 |
| 11,762,431 B2* | 9/2023 | Zhan | .................... | G06F 1/1681 361/679.27 |
| 11,815,932 B2* | 11/2023 | Kim | ...................... | G06F 1/1624 |
| 11,885,164 B2* | 1/2024 | Yang | .................... | G06F 1/1681 |

(Continued)

FOREIGN PATENT DOCUMENTS

CN 111692199 A 9/2020
KR 10-2020-0120474 A 10/2020
(Continued)

*Primary Examiner* — Anthony M Haughton
*Assistant Examiner* — Theron S Milliser
(74) *Attorney, Agent, or Firm* — Womble Bond Dickinson (US) LLP

(57) ABSTRACT

The present disclosure relates to a hinge assembly and an electronic device. The hinge assembly includes: a rotatable first cam; a rotatable second cam facing the first cam; a sliding portion in contact with the first cam and the second cam and configured to move linearly when at least one of the first cam and the second cam is rotated; and a movement reduction portion in contact with the sliding portion and configured to resist linear movement of the sliding portion.

20 Claims, 9 Drawing Sheets

(56) References Cited

U.S. PATENT DOCUMENTS

| | | | | |
|---|---|---|---|---|
| 11,889,006 B2* | 1/2024 | Kim | | H04M 1/022 |
| 11,974,407 B2* | 4/2024 | Cao | | H05K 5/0226 |
| 12,066,858 B2* | 8/2024 | Park | | H04M 1/0268 |
| 12,066,872 B2* | 8/2024 | Kim | | G06F 1/16 |
| 12,105,559 B2* | 10/2024 | Ou | | G06F 1/1652 |
| 2012/0120627 A1* | 5/2012 | O'Connor | | G06F 1/1641 |
| | | | | 16/374 |
| 2013/0219661 A1* | 8/2013 | Ge | | H04M 1/022 |
| | | | | 16/367 |
| 2014/0373338 A1* | 12/2014 | O'Connor | | G06F 1/1641 |
| | | | | 29/592.1 |
| 2018/0049329 A1* | 2/2018 | Seo | | E05D 3/06 |
| 2020/0329574 A1 | 10/2020 | Lee | | |
| 2021/0026407 A1* | 1/2021 | Park | | G06F 1/1616 |
| 2021/0120687 A1* | 4/2021 | Kim | | E05D 11/02 |
| 2021/0356998 A1 | 11/2021 | Park et al. | | |
| 2021/0365073 A1* | 11/2021 | Cha | | G06F 1/1652 |
| 2021/0405711 A1* | 12/2021 | Morrison | | G06F 1/1616 |
| 2022/0011828 A1* | 1/2022 | Zhan | | G06F 1/1652 |
| 2022/0091635 A1* | 3/2022 | Ou | | G06F 1/1652 |
| 2022/0197346 A1* | 6/2022 | Kim | | G06F 1/1652 |
| 2022/0311843 A1* | 9/2022 | Kim | | F16C 11/04 |
| 2022/0413562 A1* | 12/2022 | Kim | | G06F 1/1652 |
| 2023/0107816 A1* | 4/2023 | Yoo | | H05K 5/0226 |
| | | | | 361/679.01 |
| 2023/0136116 A1* | 5/2023 | Kim | | F16C 11/10 |
| | | | | 361/807 |
| 2023/0152849 A1* | 5/2023 | Park | | H04M 1/022 |
| | | | | 361/679.01 |
| 2023/0160243 A1* | 5/2023 | Yang | | E05D 3/18 |
| | | | | 16/354 |
| 2023/0193946 A1* | 6/2023 | Yao | | G06F 1/1681 |
| | | | | 16/233 |
| 2023/0353665 A1* | 11/2023 | Han | | G06F 1/1652 |
| 2023/0400881 A1* | 12/2023 | Kim | | G06F 1/1652 |
| 2023/0409091 A1* | 12/2023 | Kim | | G06F 1/1616 |
| 2024/0040724 A1* | 2/2024 | Cao | | F16C 11/04 |
| 2025/0093918 A1* | 3/2025 | Kim | | H04M 1/022 |

FOREIGN PATENT DOCUMENTS

KR 10-2021-0066784 A 6/2021
KR 10-2317806 B1 10/2021

* cited by examiner

HINGE ASSEMBLY AND ELECTRONIC DEVICE

CROSS-REFERENCE TO RELATED APPLICATION

This application claims priority to and the benefit of Korean Patent Application No. 10-2022-0075774, filed on Jun. 21, 2022, in the Korean Intellectual Property Office, the disclosure of which is incorporated by reference herein in its entirety.

BACKGROUND

1. Field

Aspects of embodiments of the present disclosure relate to a hinge assembly and an electronic device having the same.

2. Description of the Related Art

Mobile electronic devices are widely used. Recently, tablet personal computers (PCs) have been widely used as mobile electronic devices in addition to small electronic devices, such as mobile phones.

Such a mobile (e.g., movable) electronic device includes a display device to provide a user with visual information, such as an image or video, to support various functions. Recently, as various components for driving a display device have been miniaturized, the importance of display devices in electronic devices is gradually increasing, and a structure that can be bent to have a certain angle from a flat state has also been developed.

A hinge assembly may be disposed on the electronic device to bend the electronic device at a certain angle, as described above.

SUMMARY

A hinge assembly may guide the movement of an electronic device and/or may maintain the electronic device in a specific shape after the shape of the electronic device is changed. However, the hinge assembly may not maintain an initial function (e.g., may become less functional) after the hinge assembly is used repeatedly by, for example, having an instrumental structure. Accordingly, embodiments of the present disclosure include a hinge assembly that may maintain an electronic device in a certain shape when the electronic device is folded or unfolded and an electronic device having the hinge assembly.

Additional aspects and features of the present disclosure will be set forth, in part, in the description which follows and, in part, will be apparent from the description or may be learned by practice of the described embodiments of the present disclosure.

According to an embodiment, a hinge assembly includes: a rotatable first cam; a rotatable second cam facing the first cam; a sliding portion in contact with the first cam and the second cam and configured to move linearly when at least one of the first cam and the second cam is rotated; and a movement reduction portion in contact with the sliding portion and configured to resist linear movement of the sliding portion.

A portion at where the first cam and the sliding portion contact each other and a portion at where the second cam and the sliding portion contact each other may be inclined.

The hinge assembly may further include an internal housing configured to guide linear movement of the sliding portion.

The internal housing may include a guide protrusion inserted into the sliding portion, and the sliding portion may have a groove through which the guide protrusion is inserted into the sliding portion.

The hinge assembly may further include a sealing portion inside the groove.

The hinge assembly may further include first and second shaft portions on the internal housing and in contact with the first cam and the second cam.

The first shaft portion may be inserted into the first cam, and the second shaft portion may be inserted into the second cam.

The movement reduction portion may include: a contact portion on the internal housing and configured to contact the sliding portion when the sliding portion moves linearly; and an elastic portion on the internal housing and configured to apply force to the contact portion toward the sliding portion.

The contact portion may include: a first contact portion; and a second contact portion facing in an opposite direction to the first contact portion with respect to the elastic portion.

The hinge assembly may further include a stopper portion into which the movement reduction portion is inserted and configured to limit movement of the sliding portion.

The stopper portion may include: a first stopper portion; and a second stopper portion spaced apart from the first stopper portion.

At least one of the first cam and the second cam may include a contact protrusion protruding toward an outer surface.

According to an embodiment, an electronic device includes: a first case; a second case separated from the first case; a hinge assembly connecting the first case and the second case to each other; and a display panel configured to be foldable with respect to the first case, the second case, and the hinge assembly. The hinge assembly includes: a rotatable first cam; a rotatable second cam facing the first cam; a sliding portion in contact with the first cam and the second cam and configured to move linearly when at least one of the first cam and the second cam is rotated; and a movement reduction portion in contact with the sliding portion and configured to resist linear movement of the sliding portion.

A portion at where the first cam and the sliding portion contact each other and a portion at where the second cam and the sliding portion contact each other may be inclined.

The hinge assembly may further include an internal housing configured to guide linear movement of the sliding portion.

The internal housing may include a guide protrusion inserted into the sliding portion, and the sliding portion may have a groove through which the guide protrusion is inserted into the sliding portion.

The movement reduction portion may include: a contact portion on the internal housing and configured to contact the sliding portion when the sliding portion moves linearly; and an elastic portion on the internal housing and configured to apply force to the contact portion toward the sliding portion.

The contact portion may include: a first contact portion; and a second contact portion arranged in an opposite direction to the first contact portion with respect to the elastic portion.

The hinge assembly may further include a stopper portion into which the movement reduction portion is inserted and configured to limit movement of the sliding portion.

The stopper portion may include: a first stopper portion; and a second stopper portion spaced apart from the first stopper portion.

Other aspects and features may be apparent from the following drawings, the claims, and the detailed description of the present disclosure.

BRIEF DESCRIPTION OF THE DRAWINGS

The above and other aspects and features of the present disclosure will be more apparent from the following description, taken in conjunction with the accompanying drawings, in which.

DETAILED DESCRIPTION

Figure 1:
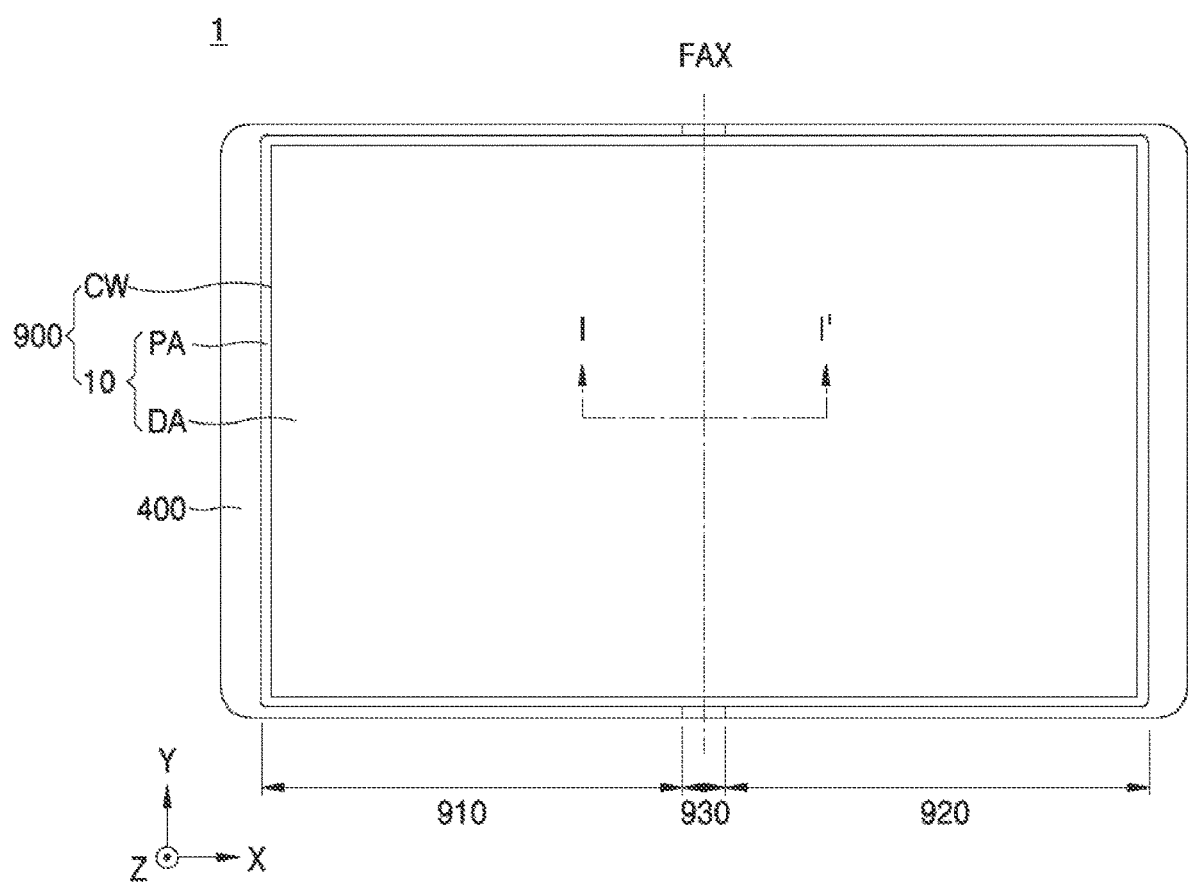
FIG. 1 is a plan view schematically illustrating an electronic device according to an embodiment.

Reference will now be made, in detail, to embodiments, examples of which are illustrated in the accompanying drawings. The described embodiments may have different forms, and the described embodiments and the present disclosure should not be construed as being limited to the descriptions set forth herein. Accordingly, the embodiments are described below, by referring to the figures, to explain aspects and features of the present description.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative terms used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

In the following embodiments, the X-direction, Y-direction, and Z-direction are not limited to three axes on an orthogonal coordinate system and may be interpreted in a broader sense. For example, the X-direction, the Y-direction, and the Z-direction may be orthogonal to each other but may refer to different directions that do not orthogonal to each other.

When some embodiments may be implemented in the present specification, a specific process order may be performed differently from the order described. For example, two processes described in succession may be substantially performed at the same time, or in an opposite order to an order to be described.

Figure 2:
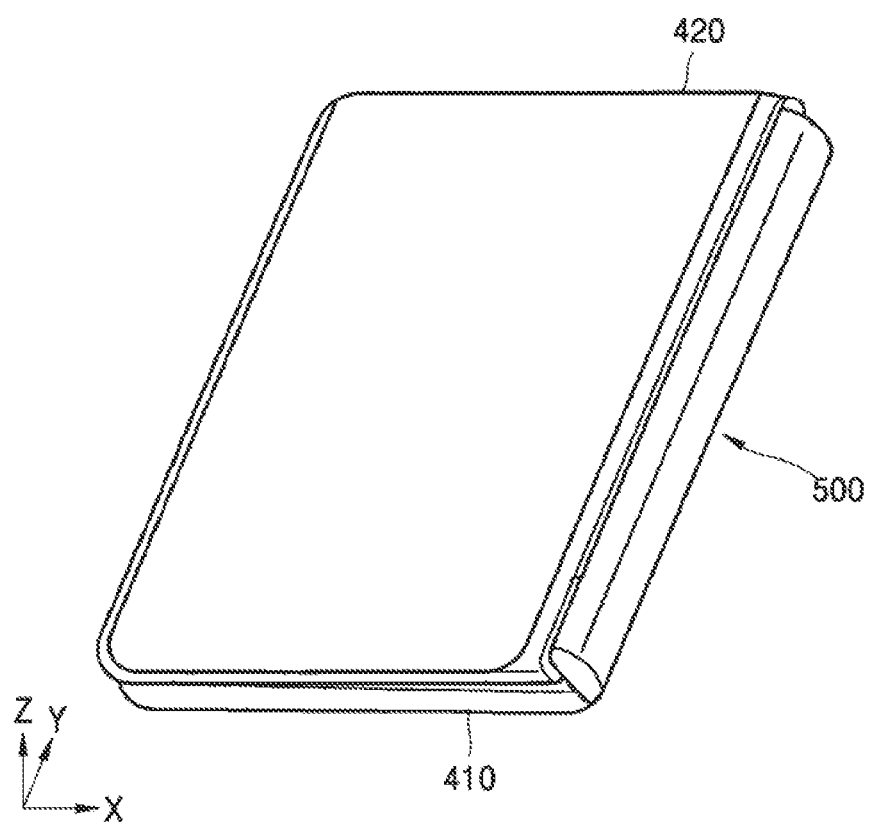
FIG. 2 is a perspective view schematically illustrating the electronic device shown in FIG. 1.
Figure 3:
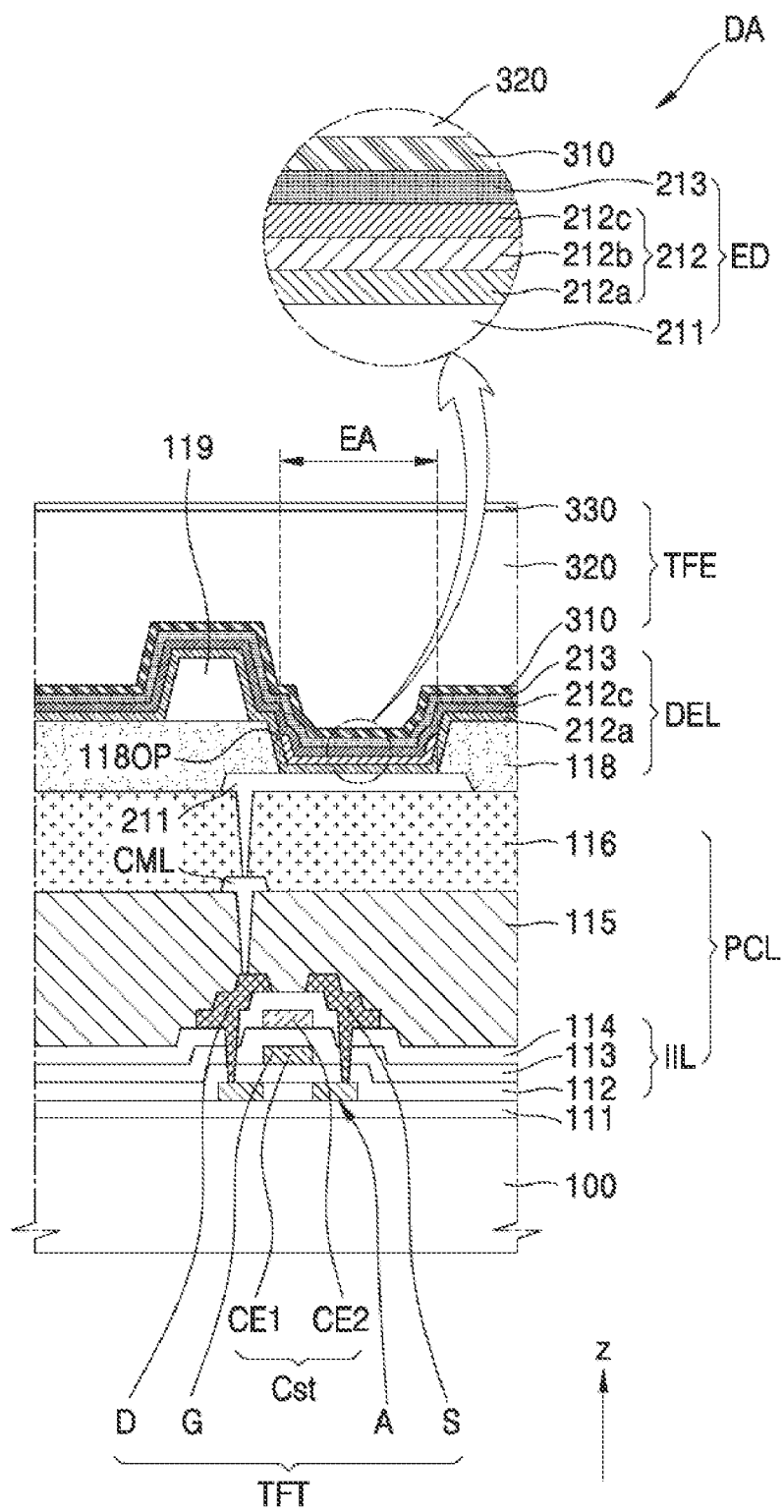
FIG. 3 is a cross-sectional view schematically illustrating a display panel of the electronic device shown in FIG. 1.
Figure 4:
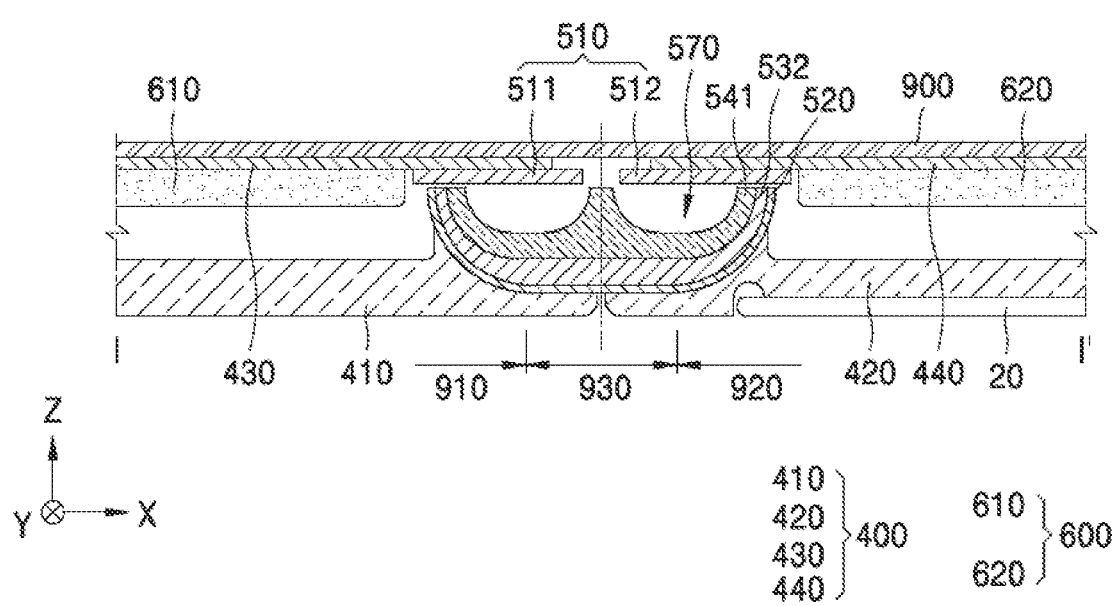
FIG. 4 is a cross-sectional view of the electronic device taken along the line I-I' of FIG. 1.

FIG. 1 is a plan view schematically illustrating an electronic device according to an embodiment. FIG. 2 is a perspective view schematically illustrating the electronic device shown in FIG. 1. FIG. 3 is a cross-sectional view schematically illustrating a display panel of the electronic device shown in FIG. 1. FIG. 4 is a cross-sectional view of the electronic device taken along the line I-I' of FIG. 1.

Referring to FIGS. 1 through 4, an electronic device 1, that is a device for displaying a video or still image, may be used as a display screen for various products, such as televisions, laptop computers, billboards, an Internet of Things (IOT) device, in addition to portable electronic devices, such as mobile phones, smartphones, a tablet personal computers (PCs), mobile communication terminals, electronic books, portable multimedia players (PMPs), navigation devices, and ultra mobile PCs (UMPCs). Also, the electronic device 1, according to an embodiment, may be used in a wearable device, such as a smart watch, a watch phone, a glass type display, and a head mounted display (HMD). In addition, the electronic device 1, according to an embodiment, may be used as an instrument panel of a vehicle, a center information display (CID) placed on a center fascia or a dash board of the vehicle, a room mirror display (RMD) replacing a side mirror of the vehicle, or a display placed on (or in) the back of a front seat as an entertainment for the rear seat passengers of the vehicle.

In an embodiment, the electronic device 1 may have long sides in a first direction and short sides in a second direction. Here, the first direction and the second direction may be directions that cross each other. For example, the first direction and the second direction may form an acute angle. In another example, the first direction and the second direction may form an obtuse angle or a right angle with each other. Hereinafter, an embodiment in which the first direction (e.g., X-direction or −X-direction) and the second direction (e.g., Y-direction and −Y-direction) form a right angle with each other will be described in detail.

In another embodiment, lengths of sides of the electronic device 1 in the first direction (e.g., X-direction or −X-direction) and lengths of sides in the second direction (e.g., Y-direction or −Y-direction) may be the same. In another embodiment, the electronic device 1 may have short sides in the first direction (e.g., X-direction or −X-direction) and long sides in the second direction (e.g., Y-direction or −Y-direction).

Corners at where the long sides in the first direction (e.g., X-direction or −X direction) and the short sides in the second direction (e.g., Y-direction or −Y direction) meet one another may have a curvature (e.g., may be rounded or chamfered).

The electronic device 1 may be folded with respect to (e.g., may be folded about) a folding axis FAX. When the electronic device 1 is folded, display surfaces of the electronic device 1 may be folded to face each other (e.g., the electronic device 1 may be folded such that the display surfaces face each other) with respect to the folding axis FAX as shown in FIG. 2 (e.g., the electronic device 1 may be in-folded). The display surfaces of the electronic device 1 may be folded (e.g., the electronic device 1 may be folded) in an opposite direction to an in-folding so that the display surfaces of the electronic device 1 are exposed to the outside with respect to the folding axis FAX when the electronic device 1 is folded (out-folded).

The electronic device 1 may include a display module 900, a buffer portion 600, a cover portion 400, and a hinge assembly 500.

The display module 900 may include a display panel 10 and a cover window CW. The cover window CW may protect the display panel 10.

The cover window CW may be a flexible window. The cover window CW may protect the display panel 10 while being easily bent according to an external force without cracking. The cover window CW may include plastic. The cover window CW may be ultra-thin glass (UTG®, a registered trademark of Samsung Electronics Co., Ltd.) or colorless polyimide (CPI), for example. The cover window CW may have a structure in which a flexible polymer layer is arranged on one side of a glass substrate or may include only a flexible polymer layer.

The display panel 10 may be disposed below the cover window CW. The display panel 10 may be attached to the cover window CW by a transparent adhesive member, such as an optical clear adhesive (OCA) film.

The display panel 10 may have a display area DA in which an image is displayed and a peripheral area PA that surrounds (e.g., surrounds in a plan view or extends around a periphery of) the display area DA. The display area DA may include a plurality of pixels, and an image may be displayed by the plurality of pixels. Each of the plurality of pixels may include sub-pixels. For example, each of the plurality of pixels may include a red sub-pixel, a green sub-pixel, and a blue sub-pixel. In some embodiments, each of the plurality of pixels may include a red sub-pixel, a green sub-pixel, a blue sub-pixel, and a white sub-pixel.

The display panel 10 may be (or may include) a display element. For example, the display panel 10 may be an organic light emitting display panel using an organic light emitting diode including an organic light emitting layer as the display element. In other embodiments, the display panel 10 may be a light emitting diode display panel using a light emitting diode (LED). The size of the LED may be micro scale or nano scale. In other embodiments, the LED may be a quantum dot light emitting display panel using a quantum dot light emitting diode including a quantum dot light emitting layer. In other embodiments, the LED may be an inorganic light emitting display panel using an inorganic light emitting device including an inorganic semiconductor. Hereinafter, an embodiment in which the display panel 10 is an organic light emitting display panel using an organic light emitting device as the display element will be described in detail.

The display panel 10 may include a substrate 100, a buffer layer 111, a pixel circuit layer PCL, a display element layer DEL, and a thin film encapsulation layer TFE.

The substrate 100 may include polymer resin, such as polyethersulfone, polyarylate, polyetherimide, polyethylene naphthalate, polyethylene terephthalate, polyphenylene sulfide, polyimide, polycarbonate, cellulose triacetate, or cellulose acetate propionate. The substrate 100, including the polymer resin, may be flexible (e.g., rollable, or bendable). The substrate 100 may have a multi-layer structure including a base layer including the above-described polymer resin and a barrier layer.

The buffer layer 111 may include an inorganic insulating material, such as silicon nitride ($SiN_x$), silicon oxynitride ($SiO_xN_y$), and silicon oxide (e.g., $SiO_2$), and may have a single layer or multi-layer structure including the above-described inorganic insulating material.

The pixel circuit layer PCL may be disposed on the buffer layer 111. The pixel circuit layer PCL may include a thin film transistor TFT included in the pixel circuit, and an inorganic insulating layer IIL, a first planarization layer 115, and a second planarization layer 116, which are disposed under or/and on elements of the thin film transistor TFT. The inorganic insulating layer IIL may include a first gate insulating layer 112, a second gate insulating layer 113, and an interlayer insulating layer 114.

The thin film transistor TFT may include a semiconductor layer A, and the semiconductor layer A may include polysilicon. In other embodiments, the semiconductor layer A may include amorphous silicon, an oxide semiconductor, or an organic semiconductor. The semiconductor layer A may have a channel region, a drain region, and a source region, with the drain and source regions being at both sides (e.g., opposite sides) of the channel region. The gate electrode G may overlap the channel region.

The gate electrode G may include a low resistance metal material. The gate electrode G may include a conductive material including molybdenum (Mo), aluminum (Al), copper (Cu), and titanium (Ti), and may have a multi-layer or single layer including the above-described materials.

A first gate insulating layer 112 between the semiconductor layer A and the gate electrode G may include an inorganic insulating material, such as silicon oxide (e.g., $SiO_2$), silicon nitride ($SiN_x$), silicon oxynitride ($SiO_xN_y$), aluminum oxide (e.g., $Al_2O_3$), titanium oxide (e.g., $TiO_2$), tantalum oxide (e.g., $Ta_2O_5$), hafnium oxide (e.g., $HfO_2$), and/or zinc oxide ($ZnO_x$). Herein, zinc oxide ($ZnO_x$) may include ZnO and/or zinc peroxide ($ZnO_2$).

The second gate insulating layer 113 may be provided to cover the gate electrode G. A second gate insulating layer 113 may include an inorganic insulating material, such as silicon oxide (e.g., $SiO_2$), silicon nitride ($SiN_x$), silicon oxynitride ($SiO_xN_y$), aluminum oxide (e.g., $Al_2O_3$), titanium oxide (e.g., $TiO_2$), tantalum oxide (e.g., $Ta_2O_5$), hafnium oxide (e.g., $HfO_2$), and/or zinc oxide ($ZnO_x$), similar to the first gate insulating layer 112. Herein, zinc oxide ($ZnO_x$) may include ZnO and/or zinc peroxide ($ZnO_2$).

An upper electrode CE2 of a storage capacitor Cst may be disposed above the second gate insulating layer 113. The upper electrode CE2 may overlap the gate electrode G thereunder. The gate electrode G and the upper electrode CE2 that overlap each other with the second gate insulating layer 113 therebetween may form the storage capacitor Cst of the pixel circuit. For example, the gate electrode G may act as a lower electrode CE1 of the storage capacitor Cst. Thus, the storage capacitor Cst and the thin film transistor TFT may overlap each other. In some embodiments, the storage capacitor Cst may not overlap the thin film transistor TFT.

The upper electrode CE2 may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), and/or copper (Cu), and may have a single layer or multi-layer structure having the above-described materials.

The interlayer insulating layer 114 may cover the upper electrode CE2. The interlayer insulating layer 114 may include silicon oxide (e.g., $SiO_2$), silicon nitride ($SiN_x$), silicon oxynitride ($SiO_xN_y$), aluminum oxide (e.g., $Al_2O_3$), titanium oxide (e.g., $TiO_2$), tantalum oxide (e.g., $Ta_2O_5$), hafnium oxide (e.g., $HfO_2$), and/or zinc oxide ($ZnO_x$). Herein, zinc oxide ($ZnO_x$) may include ZnO and/or zinc peroxide ($ZnO_2$). The interlayer insulating layer 114 may have a single layer or multi-layer structure including the above-described inorganic insulating materials.

Each of the drain electrode D and the source electrode S may be disposed on the interlayer insulating layer 114. The drain electrode D and the source electrode S may include materials having good conductivity. The drain electrode D and the source electrode S may include a conductive material including Mo, Al, Cu, and Ti and may have a multi-layer or single layer structure including the above-described materials. In an embodiment, the drain electrode D and the source electrode S may have a multi-layer structure of Ti/Al/Ti.

The first planarization layer 115 may be disposed to cover the drain electrode D and the source electrode S. The first planarization layer 115 may include an organic insulating layer. The first planarization layer 115 may include an organic insulating material such as a general-purpose polymer, such as polystyrene (PS), polymethylmethacrylate (PMMA), a polymer derivative having a phenol-based group, an acryl-based polymer, an imide-based polymer, an aryl ether-based polymer, an amide-based polymer, a fluorine-based polymer, a p-xylene-based polymer, a vinyl alcohol-based polymer, and a blend thereof.

A connection electrode CML may be disposed on the first planarization layer 115. The connection electrode CML may be connected to the drain electrode D or the source electrode S through a contact hole (e.g., a contact opening) in the first planarization layer 115. The connection electrode CML may include material having good conductivity. The connection electrode CML may include a conductive material including Mo, Al, Cu, and Ti, and may have a multi-layer or single layer including the above-described materials. In an embodiment, the connection electrode CML may have a multi-layer structure of Ti/Al/Ti.

The second planarization layer 116 may be disposed to cover the connection electrode CML. The second planarization layer 116 may include an organic insulating layer. The second planarization layer 116 may include an organic insulating material such as a general-purpose polymer, such as polystyrene (PS), polymethylmethacrylate (PMMA), a polymer derivative having a phenol-based group, an acryl-based polymer, an imide-based polymer, an aryl ether-based polymer, an amide-based polymer, a fluorine-based polymer, a p-xylene-based polymer, a vinyl alcohol-based polymer, and a blend thereof.

The display element layer DEL may be disposed on the pixel circuit layer PCL. The display element layer DEL may include a display element (also referred to as an emission device) ED. The display element ED may be an organic light emitting diode (OLED). A pixel electrode 211 of the display element ED may be electrically connected to the connection electrode CML through a contact hole (e.g., a contact opening) in the second planarization layer 116.

The pixel electrode 211 may include a conductive oxide, such as indium tin oxide (ITO), indium zinc oxide (IZO), zinc oxide (ZnO), indium oxide ($In_2O_3$), indium gallium oxide (IGO), and/or aluminum zinc oxide (AZO). In another embodiment, the pixel electrode 211 may include a reflective layer including Ag, Mg, Al, Pt, Pd, Au, Ni, Nd, Ir, Cr, or a compound thereof. In another embodiment, the pixel electrode 211 may further include a layer formed of ITO, IZO, ZnO, or $In_2O_3$ on/under the above-described reflective layer.

A pixel-defining layer 118 having an opening 1180P exposing a central portion of the pixel electrode 211 may be arranged on the pixel electrode 211 and on the second planarization layer 116. The pixel-defining layer 118 may include an organic insulating material and/or an inorganic insulating material. The opening 1180P may define an emission area EA of light emitted from the display element ED. For example, a width (or diameter) of the opening 1180P may correspond to a width (or diameter) of the emission area EA of the display element ED.

A spacer 119 may be disposed on the pixel-defining layer 118. The spacer 119 may mitigate or prevent breakage of the substrate 100 during manufacturing of the display device. A mask sheet may be used when a display panel is manufactured. In this case, the spacer 119 may prevent defects in which a portion of the substrate 100 is damaged or broken by the mask sheet when the mask sheet enters an inside of the opening 1180P in the pixel-defining layer 118 or is in close contact with the pixel-defining layer 118 and a deposition material is deposited on the substrate 100.

The spacer 119 may include an organic insulating material, such as polyimide. In other embodiments, the spacer 119 may include an inorganic insulating material, such as silicon nitride ($SiN_x$) or silicon oxide (e.g., $SiO_2$), or an organic insulating material and an inorganic insulating material.

In an embodiment, the spacer 119 may include a different material from that of the pixel-defining layer 118. In another embodiment, the spacer 119 may include the same material as that of the pixel-defining layer 118. In such an embodiment, the pixel-defining layer 118 and the spacer 119 may be formed together (e.g., may be formed concurrently or simultaneously) in a mask process using a halftone mask or the like. An intermediate layer 212 may be arranged on the pixel-defining layer 118.

The intermediate layer 212 may include an emission layer 212b arranged in the opening 1180P in the pixel-defining layer 118. The emission layer 212b may include a polymer or small molecular weight organic material that emits a certain color of light.

A first functional layer 212a and a second functional layer 212c may be arranged under and on the emission layer 212b, respectively. The first functional layer 212a may include a hole transport layer (HTL), for example, or may include a HTL and a hole injection layer (HIL). The second functional layer 212c that is arranged on the emission layer 212b may be omitted. The second functional layer 212c may include an electron transport layer (ETL) and/or an electron injection layer (EIL). The first functional layer 212a and/or the second functional layer 212c may be a common layer formed to entirely cover the substrate 100, similar to an opposite electrode 213, to be described later.

The opposite electrode 213 may include a conductive material having a low work function. For example, the opposite electrode 213 may include a (semi-) transparent layer including Ag, Mg, Al, Pt, Pd, Au, Ni, Nd, Ir, lithium (Li), Ca or an alloy thereof. In other embodiments, the opposite electrode 213 may further include a layer such as ITO, IZO, ZnO or $In_2O_3$ on the (semi-)transparent layer including the above-described materials.

In some embodiments, a capping layer may be further arranged on the opposite electrode 213. The capping layer may include an inorganic material (such as lithium fluoride (LiF)), and/or an organic material.

The thin film encapsulation layer TFE may be arranged on the opposite electrode 213. In an embodiment, the thin film encapsulation layer TFE may include at least one inorganic encapsulation layer and at least one organic encapsulation layer. The thin film encapsulation layer TFE in the embodiment shown in FIG. 3 includes a first inorganic encapsulation layer 310, an organic encapsulation layer 320, and a second inorganic encapsulation layer 330, which are sequentially stacked.

The first inorganic encapsulation layer 310 and the second inorganic encapsulation layer 330 may include at least one inorganic material from among aluminum oxide (e.g., $Al_2O_3$), titanium oxide (e.g., $TiO_2$), tantalum oxide (e.g., $Ta_2O_5$), hafnium oxide (e.g., $HfO_2$), zinc oxide ($ZnO_x$), silicon oxide (e.g., $SiO_2$), silicon nitride ($SiN_x$), and silicon oxynitride (SiON). Herein, zinc oxide ($ZnO_x$) may include ZnO and/or zinc peroxide ($ZnO_2$). The organic encapsulation layer 320 may include a polymer-based material. The polymer-based material may include acryl-based resin, epoxy-based resin, polyimide, and polyethylene. In an embodiment, the organic encapsulation layer 320 may include acrylate.

A touch electrode layer may be arranged on the thin film encapsulation layer TFE, and an optical functional layer may be arranged on the touch electrode layer. The touch electrode layer may attain coordinate information according to an external input, for example, a touch event. The optical functional layer may reduce the reflectance of light (e.g., external light) incident towards the display device from the outside and may improve the color purity of light emitted from the display device. In an embodiment, the optical functional layer may include a retarder and/or a polarizer. The retarder may be a film type or liquid crystal coating type and may include a λ/2 retarder or a λ/4 retarder. The polarizer may be a film type or liquid crystal coating type. The film type may include an elongation type synthetic resin film, and the liquid crystal coating type may include liquid crystals arranged in a certain arrangement. The retarder and the polarizer may further include a protective film.

In some embodiments, the optical functional layer may include a black matrix and color filters. The color filters may be arranged in consideration of the color of light emitted from each of pixels of the display device. Each of the color filters may include a red, green, or blue pigment or dye. In some embodiments, each of the color filters may further include quantum dots in addition to the above-described pigment or dye. In some embodiments, some of the color filters may not include the above-described pigment or dye and may include scattering particles, such as titanium oxide (e.g., $TiO_2$).

In another embodiment, the optical functional layer may include an offset interference structure. The offset interference structure may include a first reflective layer and a second reflective layer, which are arranged on different layers. First reflected light and second reflected light, which are respectively reflected by the first reflective layer and the second reflective layer, may offset interfere with each other (e.g., may destructively interfere with each other), and thus, the reflectance of external light may be reduced.

An adhesive member may be disposed between the touch electrode layer and the optical functional layer. The adhesive member may be a general adhesive member that is known in the field of technology without restrictions. The adhesive member may be a pressure sensitive adhesive (PSA) member.

The display module 900 may be folded with respect to the folding axis FAX crossing the display area DA (see, e.g., FIG. 1). The folding axis FAX may be parallel to the long sides or the short sides of the electronic device 1. The display module 900 may be folded so that one side surface and the other side surface of the display module 900 may face each other with respect to the folding axis FAX.

In FIG. 1, the folding axis FAX extends from a Y-direction to a −Y-direction. However, embodiments are not limited thereto, and the folding axis FAX may extend from an X-direction to a −X-direction. Also, one folding axis FAX is shown in FIG. 1. However, in another embodiment, the display module 900 may be folded with respect to a plurality of folding axes FAX crossing the display area DA. Hereinafter, an embodiment in which the display module 900 is folded with respect to one folding axis FAX will be described in detail.

Referring to FIG. 4, the display module 900 has a folding portion 930, a first non-folding portion 910, and a second non-folding portion 920. The display module 900 may include the cover window CW and the display panel 10, as described above with reference to FIG. 1. Each of the cover window CW and the display panel 10 may have areas corresponding to the folding portion 930, the first non-folding portion 910, and the second non-folding portion 920. The folding portion 930 may be an area folded along the folding axis FAX (see, e.g., FIG. 1) in the display module 900. The first non-folding portion 910 and the second non-folding portion 920 may be areas respectively at one side (e.g., −X-direction side of FIG. 4) and the other side (e.g., X-direction side of FIG. 4) with respect to the folding portion 930 of the display module 900. Here, it will be understood that the non-folding portion 910 and 920 do not mean that the configuration cannot be bent or unbent due to its rigidity, and the non-folding portion 910 and 920 mean a relatively flat area compared to the folding portion 930, which is folded or bent along the folding axis FAX.

The folding portion 930 may be bent between the first non-folding portion 910 and the second non-folding portion 920 so that the display module 900 may be foldable. In this case, the folding portion 930 may be bent in a U-shape with respect to the folding axis FAX. The first non-folding portion 910 and the second non-folding portion 920 may be consecutively disposed at both sides (e.g., opposite sides) of the folding portion 930.

Support portions 430 and 440 may be arranged on one surface of the display module 900, for example, a rear surface facing a display surface of the display module 900. The support portions 430 and 440 may support the display module 900. An adhesive layer may be disposed between the support portions 430 and 440 and the display module 900 so that the support portions 430 and 440 may be fixed to the display module 900.

A plurality of support portions 430 and 440 may be provided. In such an embodiment, the plurality of support portions 430 and 440 may be disposed to be spaced apart from each other. For example, the support portions 430 and 440 may include a first support portion 430 and a second support portion 440. The first support portion 430 and the second support portion 440 may be the same or similar to each other. Thus, hereinafter, the first support portion 430 will be described in detail and a repetitive description of the second support portion 440 will be omitted.

The first support portion 430 may be formed in the shape of a plate and may be disposed to correspond to the first non-folding portion 910. The first support portion 430 may be disposed to overlap the first non-folding portion 910 or at least a part of the first non-folding portion 910 and the folding portion 930. Hereinafter, for convenience of explanation, an embodiment in which the first support portion 430 overlaps at least a part of the first non-folding portion 910 and the folding portion 930 will be described in detail.

The above-described first support portion 430 may be adhered to the first non-folding portion 910 and may fix the first non-folding portion 910. In some embodiments, a portion of the first support portion 430 overlapping at least a portion of the folding portion 930 may be separated from at least a portion of the folding portion 930 so that the movement of the folding portion 930 may not be limited when the folding portion 930 is folded. For example, the adhesive layer between the first support portion 430 and the display module 900 may be disposed only between the first non-folding portion 910 and the first support portion 430 and may not be disposed between the folding portion 930 and the first support portion 430. Thus, because the folding portion 930 is not adhered to the first support portion 430, the folding portion 930 may be separated from the first support portion 430 so that, when the display module 900 is folded, the folding portion 930 may not be limited but may be freely bent to have a curvature.

The first support portion 430 and the second support portion 440 may be slightly spaced apart from each other with respect to the folding axis FAX, as shown in, for example, FIG. 4. Thus, the first support portion 430 and the second support portion 440 may not interfere with each other and may support the non-folding portions 910 and 920 and the folding portion 930 when the display module 900 is unfolded.

The buffer portion 600 may be disposed on one surface of the support portions 430 and 440, for example, a surface facing a surface on which the display module 900 is disposed. In an embodiment, the buffer portion 600 may include at least one layer, and the at least one layer may include a buffer material. The buffer material is a material having flexibility or elasticity and may be, for example, elastic substances, such as rubber, silicone, etc., and may be formed in a foam or cushion form. Thus, the buffer portion 600 may buffer shock that may be applied to the display module 900 and the support portions 430 and 440.

The buffer portion 600 may be fixed to the support portions 430 and 440. For example, an adhesive layer may be disposed between the support portions 430 and 440 and the buffer portion 600, and the buffer portion 600 may be adhered to the support portions 430 and 440 and fixed thereto.

A plurality of buffer portions 600 may be provided. In an embodiment, the buffer portion 600 may include a first buffer portion 610 and a second buffer portion 620. The first buffer portion 610 and the second buffer portion 620 may be the same or similar to each other. Thus, hereinafter, the first buffer portion 610 will be described in detail and a repetitive description of the second buffer portion 620 will be omitted.

The first buffer portion 610 may buffer a shock by an external force applied to the display module 900 and the support portions 430 and 440. For example, the first buffer portion 610 may buffer a shock applied to a portion of the first non-folding portion 910 and a portion of the first support portion 430.

The first buffer portion 610 and the second buffer portion 620 may be spaced apart from each other with respect to the folding axis FAX. A separation distance between an end of the first buffer portion 610 and an end of the second buffer portion 620 that face each other with respect to the folding axis FAX may be greater than a separation distance between an end of the first support portion 430 and an end of the second support portion 440 that face each other with respect to the folding axis FAX. For example, the end of the first buffer portion 610 may be disposed farther from the folding axis FAX than the end of the first support portion 430, and the end of the second buffer portion 620 may be disposed farther from the folding axis FAX than the end of the second support portion 440.

The cover portion 400 may be disposed at one side of the buffer portion 600, for example, a side facing a side at which the display module 900 is disposed, to cover the display module 900 and the buffer portion 600.

In an embodiment, the cover portion 400 may include a first cover (or first case) 410, a second cover (or second case) 420, a first support portion 430, and a second support portion 440. The first cover 410 and the second cover 420 may be the same or similar to each other. Thus, hereinafter, the first cover 410 will be described in detail and a repetitive description of the second cover 420 will be omitted.

The first cover 410 may be rotatably connected to a hinge assembly 500 (see, e.g., FIG. 2), to be described later, and may cover a portion of the first non-folding portion 910 of the display module 900 and a portion of the folding portion 930 adjacent to the first non-folding portion 910. For example, when the display module 900 is unfolded, the first cover 410 may be disposed in parallel to the display module 900 and may cover the display module 900 and the hinge assembly 500. When the display module 900 is folded, the first cover 410 may rotate along the circumference of the hinge assembly 500 and may expose the hinge assembly 500 to the outside, thereby covering the display module 900. In such an embodiment, the first cover 410 may rotate slidably outside the hinge assembly 500 (e.g., to a side at which the hinge assembly 500 is exposed to an external environment).

A portion of the first cover 410 and the second cover 420 may be respectively connected to the support portions 430 and 440. Thus, the first cover 410 and the second cover 420 and the support portions 430 and 440 may move or rotate integrally.

In an embodiment, a second display panel 20 may be disposed on at least one of the first cover 410 and the second cover 420. Hereinafter, an embodiment in which the second display panel 20 is disposed on the second cover 420 will be described. The second display panel 20 may be disposed on one surface of the second cover 420. For example, the second display panel 20 may be disposed on an outer surface of the second cover 420, such as a surface facing a surface toward the display module 900. In an embodiment, the second cover 420 may include a groove for accommodating the second display panel 20 on an outer surface of the second cover 420, and the second display panel 20 may be disposed in the groove. The second display panel 20 may be substantially the same as the display panel 10.

In another embodiment, the second display panel 20 may not be disposed on at least one of the first cover 410 and the second cover 420. In such an embodiment, both the first cover 410 and the second cover 420 may not form a groove for accommodating the second display panel 20 similar to the first cover 410 as shown in FIG. 4.

Hereinafter, for convenience of explanation, an embodiment in which the second display panel 20 is disposed on at least one of the first cover 410 and the second cover 420 will be described in detail.

The hinge assembly 500 may be disposed between the first cover 410 and the second cover 420 to be connected to the first cover 410 and the second cover 420 so that the first cover 410 and the second cover 420 may be rotatable. In such an embodiment, the hinge assembly 500 may include a hinge cover 520, an internal housing 530 (see, e.g., FIG. 6), a connection portion 510 including the first connection portion 511 and the second connection portion 512, a first rotation guide portion 540, and a second rotation guide portion 570.

Figure 5:
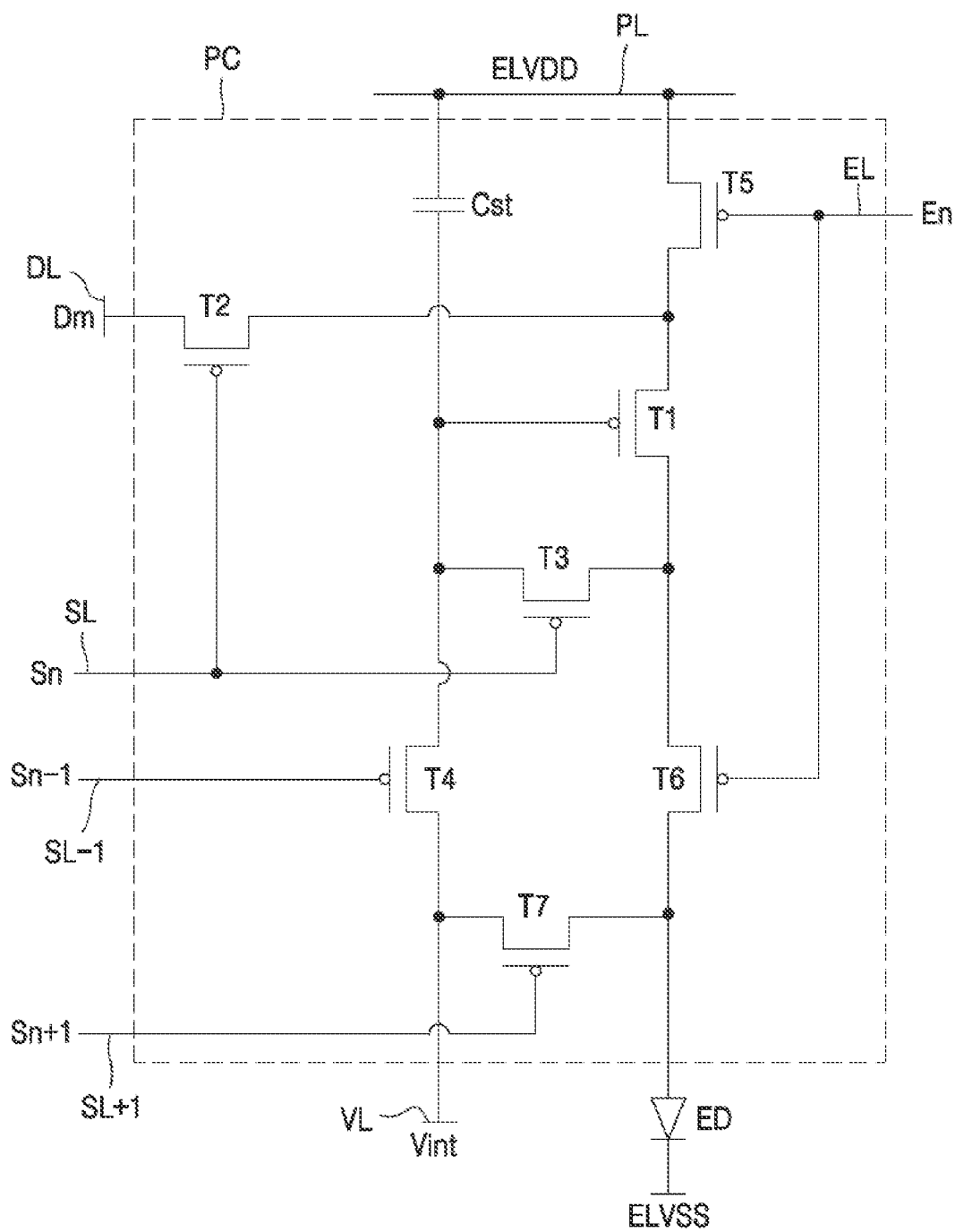
FIG. 5 is a schematic circuit diagram of the display panel shown in FIG. 3.

FIG. 5 is a schematic circuit diagram of the display panel shown in FIG. 3.

Referring to FIG. 5, the pixel circuit PC may be connected to an emission device ED and may implement emission of sub-pixels. In such an embodiment, the emission device ED may include the organic light emitting element (i.e., the organic light-emitting diode) shown in FIG. 3. In an embodiment, the pixel circuit PC may include a driving thin film transistor T1, a switching thin film transistor T2, and a storage capacitor Cst. The switching thin film transistor T2 may be connected to a scan line SL and a data line DL and may transmit a data signal Dm input through the data line DL in response to a scan signal Sn input through the scan line SL to the driving thin film transistor T1, where n and m may each be positive integers.

The storage capacitor Cst may be connected to the switching thin film transistor T2 and a driving voltage line PL and may store a voltage corresponding to a difference between a voltage transmitted from the switching thin film transistor T2 and a driving voltage ELVDD supplied to the driving voltage line PL.

The driving thin film transistor T1 may be connected to the driving voltage line PL and the storage capacitor Cst and may control a driving current that flows through the emission device ED from the driving voltage line PL in response to a voltage value stored in the storage capacitor Cst. The emission device ED may emit light having certain brightness according to the driving current.

The pixel circuit PC may include the driving thin film transistor T1, the switching thin film transistor T2, a compensation thin film transistor T3, a first initialization thin film transistor T4, an operation control thin film transistor T5, an emission control thin film transistor T6, and a second initialization thin film transistor T7.

In FIG. 5, an embodiment in which each pixel circuit PC includes signal lines SL, SL−1, SL+1, EL and DL, an initialization voltage line VL and a driving voltage line PL is shown. However, the present disclosure is not limited thereto. In an embodiment, at least one of the signal lines SL, SL−1, SL+1, EL, and DL, or/and the initialization voltage line VL may be shared with adjacent pixel circuits.

A drain electrode of the driving thin film transistor T1 may be electrically connected to the emission device ED via the emission control thin film transistor T6. The driving thin film transistor T1 may receive a data signal Dm according to a switching operation of the switching thin film transistor T2 to supply the driving current to the emission device ED.

A gate electrode of the switching thin film transistor T2 may be connected to the scan line SL, and a source electrode of the switching thin film transistor T2 may be connected to the data line DL. A drain electrode of the switching thin film transistor T2 may be connected to a source electrode of the driving thin film transistor T1 and may be connected to the driving voltage line PL via the operation control thin film transistor T5.

The switching thin film transistor T2 may be turned on according to the scan signal Sn transmitted through the scan line SL and may perform a switching operation of transmitting the data signal Dm transmitted through the data line DL to the source electrode of the driving thin film transistor Ti.

A gate electrode of the compensation thin film transistor T3 may be connected to the scan line SL. A source electrode of the compensation thin film transistor T3 may be connected to a drain electrode of the driving thin film transistor T1 and may be connected to a pixel electrode of the emission device ED via the emission control thin film transistor T6. A drain electrode of the compensation thin film transistor T3 may be connected to one electrode of the storage capacitor Cst, a source electrode of the first initialization thin film transistor T4, and a gate electrode of the driving thin film transistor T1. The compensation thin film transistor T3 may be turned on in response to the scan signal Sn transmitted through the scan line SL and may connect the gate electrode and the drain electrode of the driving thin film transistor T1 to each other, thereby diode-connecting the driving thin film transistor T1.

A gate electrode of the first initialization thin film transistor T4 may be connected to the previous scan line SL−1. A drain electrode of the first initialization thin film transistor T4 may be connected to an initialization voltage line VL. A source electrode of the first initialization thin film transistor T4 may be connected to one electrode of the storage capacitor Cst, a drain electrode of the compensation thin film transistor T3, and a gate electrode of the driving thin film transistor T1 together. The first initialization thin film transistor T4 may be turned on in response to the previous scan signal Sn−1 transmitted through the previous scan line SL−1 and may perform an initialization operation of transmitting an initialization voltage Vint to the gate electrode of the driving thin film transistor T1 to initialize a voltage of the gate electrode of the driving thin film transistor T1.

A gate electrode of the operation control thin film transistor T5 may be connected to the emission control line EL. A source electrode of the operation control thin film transistor T5 may be connected to the driving voltage line PL. A drain electrode of the operation control thin film transistor T5 may be connected to the source electrode of the driving thin film transistor T1 and the drain electrode of the switching thin film transistor T2.

A gate electrode of the emission control thin film transistor T6 may be connected to the emission control line EL. A source electrode of the emission control thin film transistor T6 may be connected to the drain electrode of the driving thin film transistor T1 and the source electrode of the compensation thin film transistor T3. A drain electrode of the emission control thin film transistor T6 may be electrically connected to a pixel electrode of the emission device ED. The operation control thin film transistor T5 and the emission control thin film transistor T6 may be simultaneously turned on in response to the emission control signal En transmitted through the emission control line EL so that the driving voltage ELVDD may be transmitted to the emission device ED and a driving current may flow through the emission device ED.

A gate electrode of the second initialization thin film transistor T7 may be connected to the subsequent scan line SL+1. A source electrode of the second initialization thin film transistor T7 may be electrically connected to the pixel electrode of the emission device ED. A drain electrode of the second initialization thin film transistor T7 may be connected to the initialization voltage line VL. The second initialization thin film transistor T7 may be turned in response to a subsequent scan signal Sn+1 transmitted through the subsequent scan line SL+1 to initialize a voltage of the pixel electrode of the emission device ED.

An embodiment in which the first initialization thin film transistor T4 and the second initialization thin film transistor T7 are connected to the previous scan line SL−1 and the subsequent scan line SL+1, respectively, is shown. However, the present disclosure is not limited thereto. In an embodiment, both the first initialization thin film transistor T4 and the second initialization thin film transistor T7 may be connected to the previous scan line SL−1 and may be driven in response to the previous scan signal Sn−1.

Another electrode of the storage capacitor Cst may be connected to the driving voltage line PL. One electrode of the storage capacitor Cst may be connected to the gate electrode of the driving thin film transistor T1, the drain electrode of the compensation thin film transistor T3, and the source electrode of the first initialization thin film transistor T4 together.

An opposite electrode (e.g., cathode) of the emission device ED may receive a common voltage ELVSS. The emission device ED may emit light by receiving the driving current from the driving thin film transistor T1.

The pixel circuit PC may not be limited to the number of thin film transistors and storage capacitors and a circuit design as described above, and the number of thin film transistors and storage capacitors and the circuit design may be variously modified.

Figure 6:
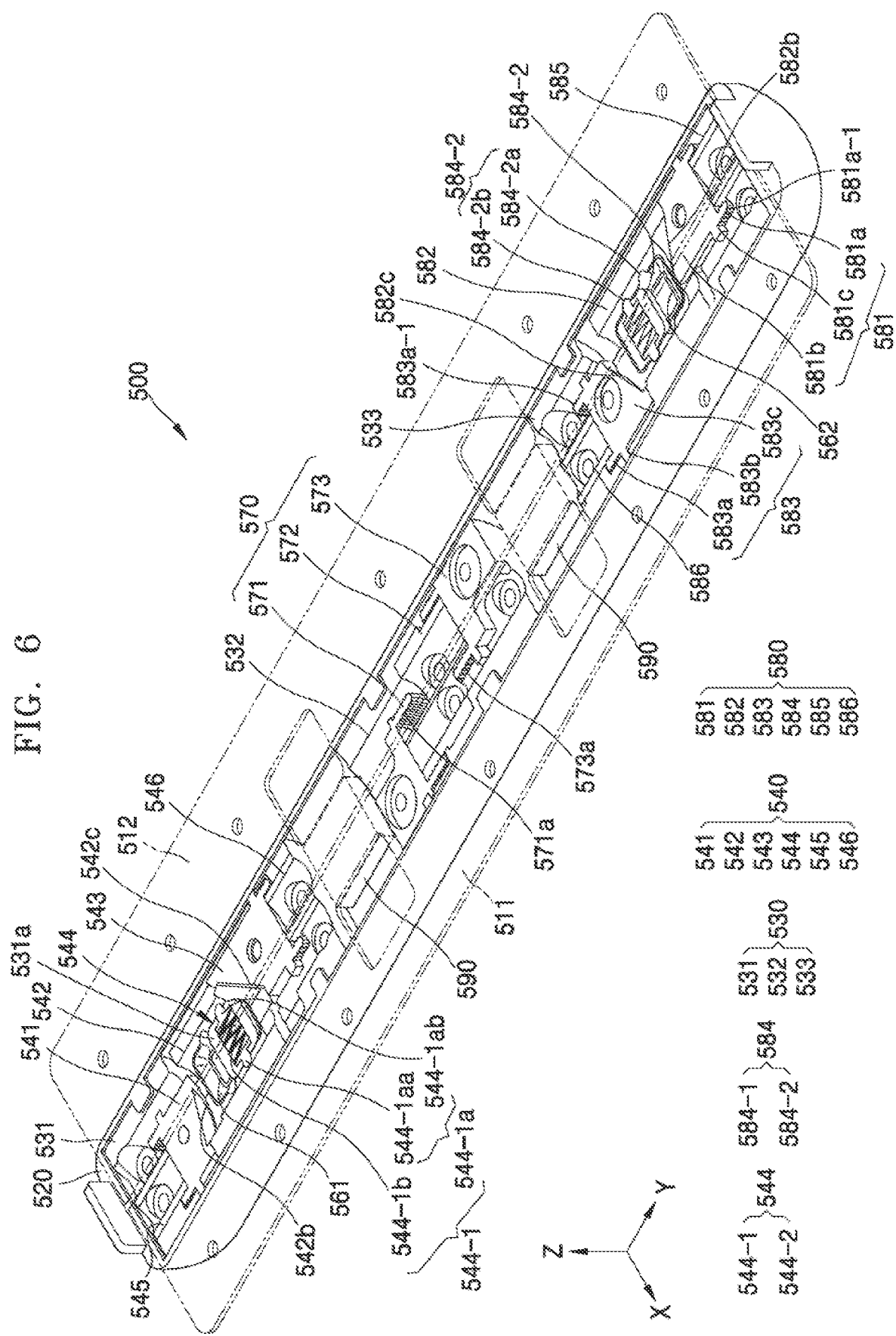
FIG. 6 is a perspective view schematically illustrating a hinge assembly of the electronic device shown in FIGS. 1 and 2.
Figure 7:
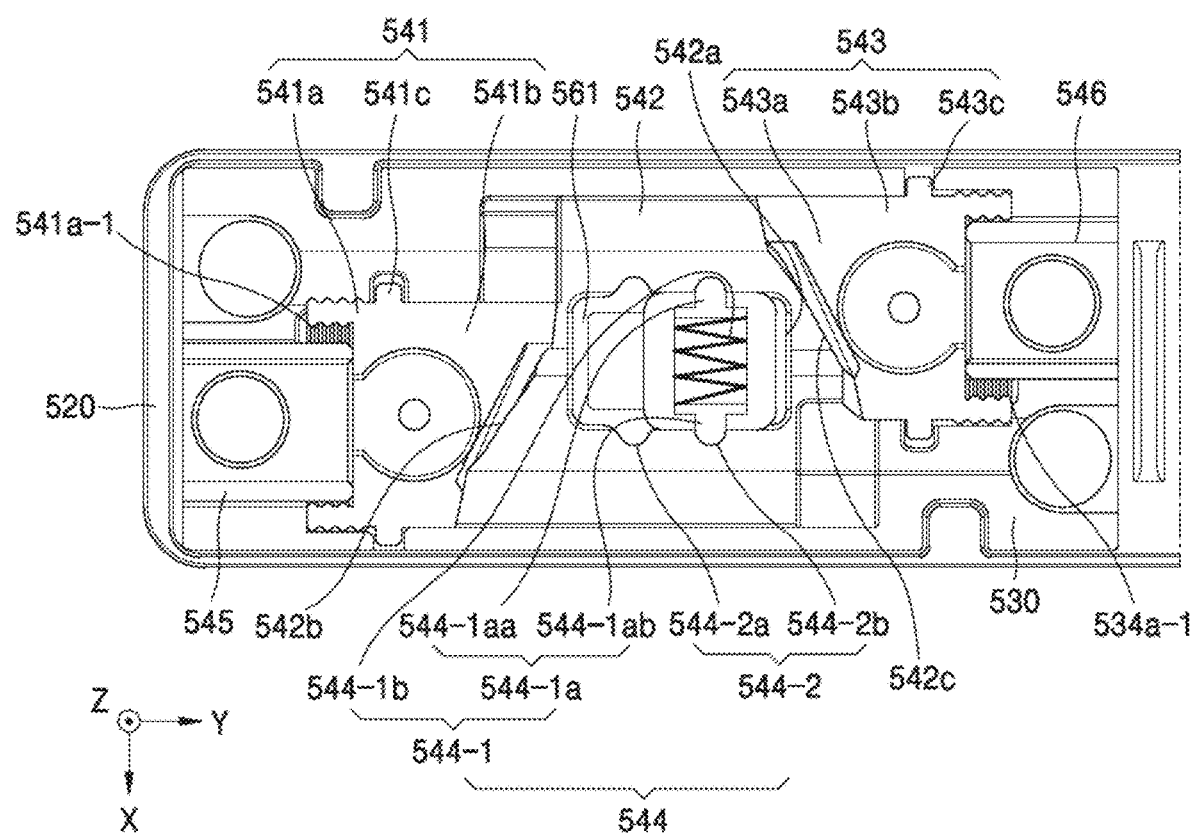
FIGS. 7 through 9 are plan views schematically illustrating an operation of a portion of the hinge assembly shown in FIG. 6.
Figure 8:
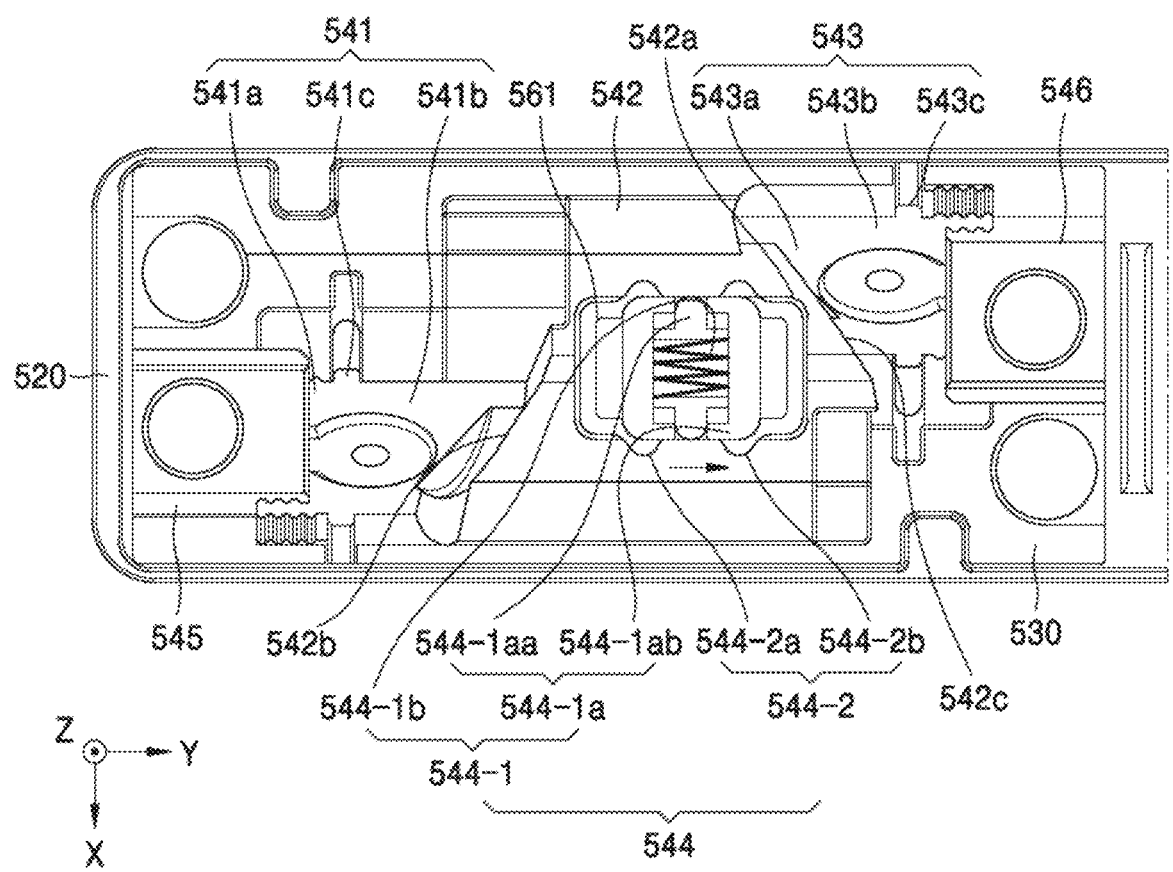
Figure 9:
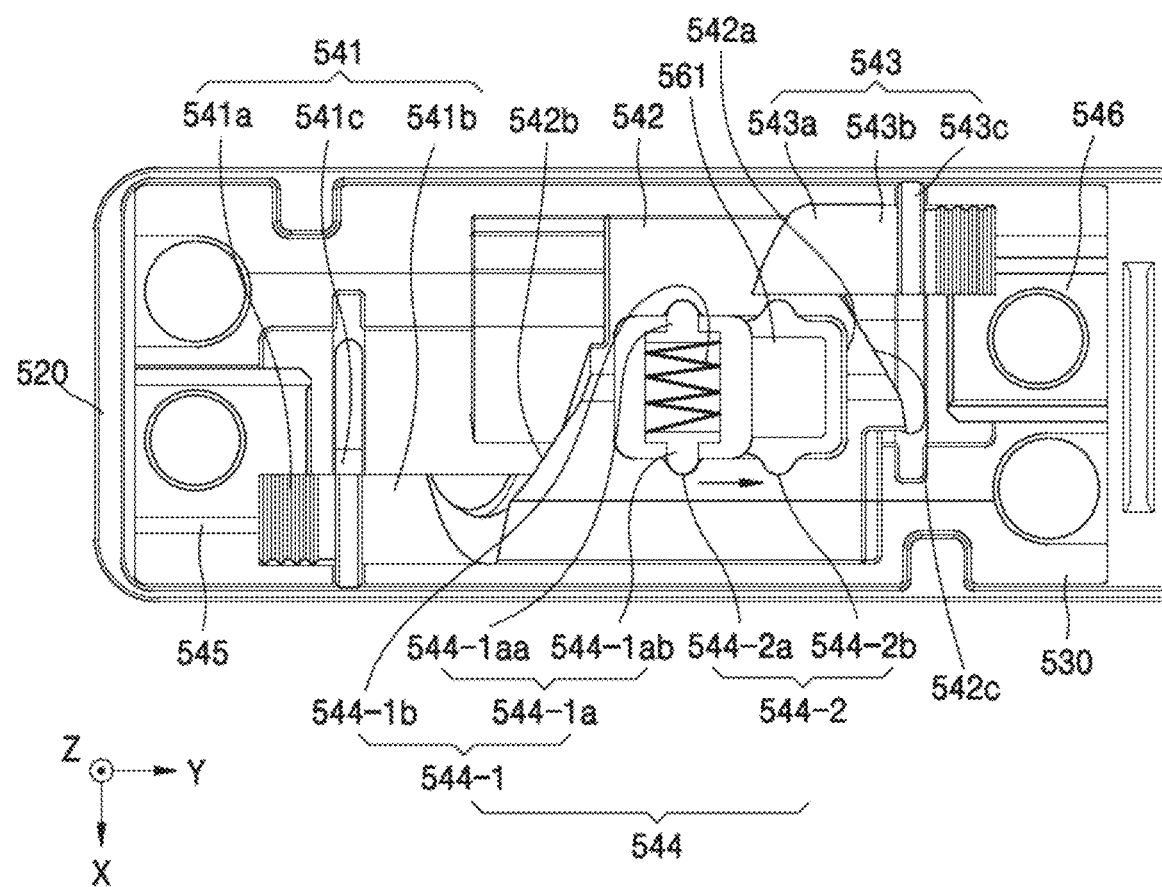

FIG. 6 is a perspective view schematically illustrating the hinge assembly of the electronic device shown in FIGS. 1 and 2. FIGS. 7 through 9 are plan views schematically illustrating an operation of a portion of the hinge assembly shown in FIG. 6.

Referring to FIGS. 6 through 9, the hinge assembly 500 may include a hinge cover 520, an internal housing 530, a first connection portion 511, a second connection portion 512, a first rotation guide portion 540, a second rotation guide portion 570, and a third rotation guide portion 580.

The hinge cover 520 may form an outer appearance and may be rounded. A space may be provided inside the hinge cover 520.

The internal housing 530 may be disposed inside the hinge cover 520 and may be fixed to the hinge cover 520. The internal housing 530 may include a first internal housing 531, a second internal housing 532, and a third internal housing 533. The first internal housing 531 may be disposed to correspond to the first rotation guide portion 540, and the second internal housing 532 may be disposed to correspond to the second rotation guide portion 570. In addition, the third internal housing 533 may be disposed to correspond to the third rotation guide portion 580. The first internal housing 531, the second internal housing 532, and the third internal housing 533 may be disposed inside the hinge cover 520 to be spaced apart from each other. In another embodiment, the first internal housing 531, the second internal housing 532, and the third internal housing 533 may be disposed inside the hinge cover 520 and may also be connected to one another. In such an embodiment, the second internal housing 532 may be disposed in the center of the hinge cover 520, and the first internal housing 531 and the third internal housing 533 may be disposed at both ends of the hinge cover 520 to be spaced apart from each other.

The first connection portion 511 and the second connection portion 512 may be disposed to face each other. For example, the first connection portion 511 and the second connection portion 512 may be disposed at both sides of the hinge cover 520. In such an embodiment, the first connection portion 511 and the second connection portion 512 may be separated from each other and may rotate. In addition, each of the first connection portion 511 and the second connection portion 512 may be connected to each cover portion.

The first internal housing 531, described above, may guide the movement of a first sliding portion 542, to be described later. The first internal housing 531 may include a first protrusion 531a that protrudes toward the first rotation guide portion 540. The first protrusion 531a may guide the linear movement of the first sliding portion 542 when the first sliding portion 542 moves linearly.

The second internal housing 532 may be disposed inside the hinge cover 520 and may be coupled to the hinge cover 520. The second internal housing 532 may be disposed to correspond to the second rotation guide portion 570.

The third rotation guide portion 580 may be disposed at an opposite side to the first rotation guide portion 540 with respect to the second rotation guide portion 570. The first rotation guide portion 540 and the third rotation guide portion 580 may be disposed at both sides of the second rotation guide portion 570. The second rotation guide portion 570 may be disposed in the center of the hinge assembly 500.

The first rotation guide portion 540, the second rotation guide portion 570, and the third rotation guide portion 580, described above, may be connected to each cover portion and may guide rotation of each cover portion. Each of the first rotation guide portion 540, the second rotation guide portion 570, and the third rotation guide portion 580 may be connected to the first connection portion 511 and the second connection portion 512.

The first rotation guide portion 540 may include a first cam 541, a first sliding portion 542, a second cam 543, a first movement reduction portion 544, a first shaft (also referred to as a first shaft portion) 545, and a second shaft (also referred to as a second shaft portion) 546.

The first cam 541 may be rotatably disposed on the first internal housing 531. The first shaft 545 may have a shape in which it is inserted into the first cam 541. The first shaft 545 and the first internal housing 531 may limit the first cam 541, thereby preventing the first cam 541 from deviating while the first cam 541 rotates. The first cam 541 may have a semi-cylindrical shape. Also, the first cam 541 may be coupled to the first connection portion 511 and may rotate according to the movement of the first connection portion 511 or may rotate the first connection portion 511. One surface of the first cam 541 that contacts the first connection portion 511 may be flat.

The first cam 541 may include a first insertion portion 541*a* inserted into the first shaft 545 and a first inclined portion 541*b* connected to (e.g., extending from) the first insertion portion 541*a*. Also, the first cam 541 may include a first seating protrusion 541*c* that protrudes from at least one outer surface of the first insertion portion 541*a* and the second insertion portion 543*a*.

The first insertion portion 541*a* may be formed as a pillar having a semi-circular cross-section, and a groove through which the first shaft 545 may be inserted into the first insertion portion 541*a*, may be formed. Also, a first contact protrusion 541*a*-1 may be disposed on an outer surface and an inner surface of the first insertion portion 541*a*. The first contact protrusion 541*a*-1 may be in contact with at least one of the outer surface of the first shaft 545 and the inner surface of the first internal housing 531, thereby preventing the first cam 541 from quickly rotating. The first contact protrusion 541*a*-1 may have various shapes. For example, the first contact protrusion 541*a*-1 may be formed in the shape of a line and may be formed to rotate at least one of the inner surface and the outer surface of the first insertion portion 541*a* once. In another embodiment, the first contact protrusion 541*a*-1 may be formed in the shape of a plurality of protrusions spaced apart from each other. The first contact protrusion 541*a*-1 is not limited to the above description, and may include all structures that are in contact with at least one of the first shaft 545 and the first internal housing 531 and slow rotation of the first cam 541 to a certain extent or reduce a rotation speed of the first cam 541.

The first inclined portion 541*b* may be in contact with the first sliding portion 542 and may linearly move the first sliding portion 542. A side surface of the first inclined portion 541*b* that contacts the first sliding portion 542 may be inclined. The side surface of the first inclined portion 541*b* may be formed in a spiral form.

The first seating protrusion 541*c* may protrude from an outer surface of at least one of the first insertion portion 541*a* and the first inclined portion 541*b*. The first seating protrusion 541*c* may be inserted into the internal housing 530 and may prevent the first cam 541 from linearly moving while the first cam 541 rotates.

The first sliding portion 542 may be disposed between the first cam 541 and the second cam 543. The first sliding portion 542 may be disposed on the first internal housing 531 to move linearly. The first sliding portion 542 may move linearly when at least one of the first cam 541 and the second cam 543 rotates. A first guide groove 542*a* may be disposed in the center of the first sliding portion 542, and a first protrusion 531*a* may be inserted into the first guide groove 542*a*. Also, a first sealing portion 561 may be disposed inside the first guide groove 542*a*. In this case, the first sealing portion 561 may be disposed between the first protrusion 531*a* and an inside of the first guide groove 542*a* and may reduce the movement of the first sliding portion 542 in a height direction of the first protrusion 531*a* or deviation of the first sliding portion 542 from the first protrusion 531*a*.

In the above embodiment, both sides of the first sliding portion 542 may be inclined. Because each of both sides of the first sliding portion 542 is in contact with the first inclined portion 541*b* and the second inclined portion 543*b*, to be described later, both sides of the first sliding portion 542 may correspond to the side surface of the first inclined portion 541*b* and the side surface of the second inclined portion 543*b*. For example, the first sliding portion 542 may include a first inclined surface 542*b* that contacts the inclined surface of the first inclined portion 541*b* and a second inclined surface 542*c* that contacts the inclined surface of the second inclined portion 543*b* to be described later. The first inclined surface 542*b* and the second inclined surface 542*c* may correspond to the inclined surface of the first inclined portion 541*b* and the inclined surface of the second inclined portion 543*b*.

Also, one surface of the first sliding portion 542 may be rounded. Thus, the first sliding portion 542 may not impede (or may not resist) the movement of at least one of the first connection portion 511 and the second connection portion 512 while the first connection portion 511 and the second connection portion 512 rotate.

The second cam 543 may be rotatably disposed on the first internal housing 531. The second cam 543 may be formed to be the same as or similar to the first cam 541, respectively. For example, the second cam 543 may include a second insertion portion 543*a*, a second inclined portion 543*b*, and a second seating protrusion 543*c*, and the second insertion portion 543*a*, the second inclined portion 543*b*, and the second seating protrusion 543*c* may be the same as or similar to the first insertion portion 541*a*, the first inclined portion 541*b*, and the first seating protrusion 541*c* described above.

In the above embodiment, the second cam 543 may be disposed in an opposite direction to the first cam 541. The second cam 543 may be connected to the second connection portion 512 and may be in contact with the first sliding portion 542.

In the above embodiment, one of the first cam 541 and the second cam 543 may rotate when another one of the first cam 541 and the second cam 543 rotates. In another embodiment, the first cam 541 and the second cam 543 may rotate concurrently (or simultaneously). A rotation direction of the first cam 541 and a rotation direction of the second cam 543 may be opposite to each other. Also, when at least one of the first cam 541 and the second cam 543 rotates as described above, the first sliding portion 542 may move linearly. The movement direction of the first sliding portion 542 may be different according to the rotation direction of at least one of the first cam 541 and the second cam 543.

The first movement reduction portion 544 may be disposed between the first protrusion 531*a* and the first sliding portion 542 and may impede (or resist) the movement of the first sliding portion 542. For example, the first movement reduction portion 544 may be in contact with the first sliding portion 542 while the first sliding portion 542 moves linearly.

The first movement reduction portion 544 described above may include a first frictional force provision portion 544-1 and a first stopper portion 544-2.

One of the first frictional force provision portion 544-1 and the first stopper portion 544-2 described above may be disposed to be inserted into the inside of the first protrusion 531*a* or inserted into a groove formed in the outer surface of the first protrusion 531*a*. When the first frictional force provision portion 544-1 is disposed on the outer surface of the first protrusion 531*a*, a separately provided cover may be included in the first protrusion 531*a*. Another one of the first frictional force provision portion 544-1 and the first stopper portion 544-2 may be disposed to be inserted into the inside of the first sliding portion 542 or inserted into a groove formed in the outer surface of the first sliding portion 542. However, hereinafter, for convenience of explanation, an embodiment in which the first frictional force provision portion 544-1 may be disposed on the first protrusion 531*a* and the first stopper portion 544-2 is disposed on the first sliding portion 542 will be described in detail.

The first frictional force provision portion 544-1 may be disposed on the first protrusion 531*a*. The first frictional force provision portion 544-1 may be disposed to be completely inserted into the inside of the first protrusion 531*a* or to be inserted into a groove formed in one surface of the first protrusion 531*a*. Hereinafter, for convenience of explanation, a shape in which the first frictional force provision portion 544-1 is disposed to be inserted into the groove formed in one surface of the first protrusion 531*a* and is exposed to the outside of the first protrusion 531*a* will be described in detail. A separate cover for shielding the groove formed in the first protrusion 531*a* may also be provided so that the first frictional force provision portion 544-1 is not exposed to the outside of the first protrusion 531*a*.

The first frictional force provision portion 544-1 may include a first elastic portion 544-1*b* disposed on the first protrusion 531*a* and a first contact portion 544-1*a* disposed on the first elastic portion 544-1*b*. Also, the first stopper portion 544-2 may be disposed on another one of the first protrusion 531*a* and the first sliding portion 542. However, hereinafter, for convenience of explanation, an embodiment in which the first frictional force provision portion 544-1 may be disposed on the first protrusion 531*a* and the first stopper portion 544-2 is disposed on the first sliding portion 542 will be described in detail.

In the above embodiment, the first frictional force provision portion 544-1 may include a first elastic portion 544-1*b* disposed inside the first protrusion 531*a* and a first contact portion 544-1*a*, which is disposed at an end of the first elastic portion 544-1*b* and of which at least a portion protrudes to the outside of the first protrusion 531*a*.

The first elastic portion 544-1*b* may include a compressive spring and/or an elastic bar formed of an elastic material such as rubber, silicon, or the like.

The first contact portion 544-1*a* may have lengthwise cross-sections that are differently formed. For example, a cross-section of a portion of the first contact portion 544-1*a* and a cross-section of another portion of the first contact portion 544-1*a* may be different from each other. For example, a cross-section of a portion of the first contact portion 544-1*a* may be less than a cross-section of another portion of the first contact portion 544-1*a*. A portion of the first contact portion 544-1*a* may protrude toward the outside of the first protrusion 531*a*, and another portion of the first contact portion 544-1*a* may prevent the first contact portion 544-1*a* from deviating from the outside of the first protrusion 531*a*. A portion of the first contact portion 544-1*a* protruding toward the outside of the first protrusion 531*a* may have various shapes, such as a hemispherical shape, a cylindrical shape, a polygonal pillar shape, and the like. The first contact portion 544-1*a* described above may be disposed at one of ends of the first elastic portion 544-1*b* or at both ends of the first elastic portion 544-1*b*. For example, when the first contact portion 544-1*a* is disposed at both the ends of the first elastic portion 544-1*b*, a pair of first contact portions 544-1*a* may be disposed to be symmetrical with each other with respect to the first elastic portion 544-1*b*. For example, the first contact portion 544-1*a* may include a (1-1)-th contact portion 544-1*aa* disposed at one end of the first elastic portion 544-1*b* and a (1-2)-th contact portion 544-1*ab* disposed at the other end of the first elastic portion 544-1*b*. Hereinafter, for convenience of explanation, the first contact portion 544-1*a* may also be disposed at each of ends of the first elastic portion 544-1*b*.

The first shaft 545 may be fixed to the first internal housing 531. The first shaft 545 may guide rotation of the first cam 541 while the first cam 541 rotates. One surface of the first shaft 545, described above, may be rounded, and an insertion groove may be formed in one surface of the first shaft 545. Thus, when the first connection portion 511 rotates, one surface of the first shaft 545 may be prevented from being in contact with the end (or side) of the first connection portion 511.

The second shaft 546 may be fixed to the first internal housing 531. The second shaft 546 may be formed to be the same as or similar to the first shaft 545 and may be disposed to be symmetrical with each other in a diagonal direction with respect to the first shaft 545. The second shaft 546 may guide rotation of the second cam 543.

The first frictional force provision portion 544-1 may be selectively inserted into the first stopper portion 544-2. For example, the first stopper portion 544-2 may have a groove shape. The first stopper portion 544-2 may include a (1-1)-th stopper portion 544-2*a* and a (1-2)-th stopper portion 544-2*b*, which are spaced apart from each other. The (1-1)-th stopper portion 544-2*a* and the (1-2)-th stopper portion 544-2*b* may be disposed at different positions. The (1-1)-th stopper portion 544-2*a* and the (1-2)-th stopper portion 544-2*b* may be disposed on an inner surface of the first guide groove 542*a*.

The (1-1)-th stopper portion 544-2*a* and the (1-2)-th stopper portion 544-2*b*, described above, may maintain the display module 900 (see, e.g., FIG. 1) in a certain shape. For example, the (1-1)-th stopper portion 544-2*a* may maintain the display module 900 to be in a folded state, and the (1-2)-th stopper portion 544-2*b* may maintain the display module 900 in an unfolded state.

The second rotation guide portion 570 may be disposed between a plurality of first rotation guide portions 540. For example, the second rotation guide portion 570 may be disposed between a pair of first rotation guide portions 540.

The second rotation guide portion 570 may include a first rotation portion 571 and a second rotation portion 573, which are connected to the first connection portion 511 and the second connection portion 512, respectively. Also, the second rotation guide portion 570 may include a first rotation portion 571 and a rotation shaft portion 572 that guides rotation of the second rotation portion 573 and is coupled to the internal housing 530. The rotation shaft portion 572 may include a plurality of rotation shafts, thereby being inserted into the first rotation portion 571 and the second rotation portion 573. The first rotation portion 571 may include a third contact protrusion 571*a* that is disposed in at least one of a portion that meets the rotation shaft portion 572 and at a point where the first rotation portion 571 meets the second internal housing 532. Also, the second rotation portion 573 may include a fourth contact protrusion 573a that is disposed in at least one of a portion that meets the rotation shaft portion 572 and at a point where the second rotation portion 573 meets the second internal housing 532.

Thus, high-speed rotation of at least one of the first connection portion 511 and the second connection portion 512 may be prevented.

The third rotation guide portion 580 may be the same as or similar to the first rotation guide portion 540. For example, the third rotation guide portion 580 may include a third cam 581, a second sliding portion 582, a fourth cam 583, a second movement reduction portion 584, a third shaft 585, and a fourth shaft 586.

The third cam 581 may be connected to the second connection portion 512, and the fourth cam 583 may be connected to the first connection portion 511.

The third cam 581 may include a third insertion portion 581a, a third inclined portion 581b, and a third seating protrusion 581c, and the third insertion portion 581a may include a fifth contact protrusion 581a-1. The third insertion portion 581a, the third inclined portion 581b, the third seating protrusion 581c, and the fifth contact protrusion 581a-1 may be the same as or similar to the above-described first insertion portion 541a, the first inclined portion 541b, the first seating protrusion 541c, and the first contact protrusion 541a-1 respectively, and thus, a detailed description thereof will be omitted.

The second sliding portion 582 may include a second guide groove 582a through which the second protrusion 533a of the third internal housing 533 may be inserted into the second sliding portion 582. A second sealing portion 562 may be disposed inside the second guide groove 582a. Also, the second sliding portion 582 may include a third inclined surface 582b that contacts the third cam 581 and a fourth inclined surface 582c that contacts the fourth cam 583. The second sliding portion 582, the second protrusion 533a, and the second sealing portion 562 are the same as or similar to the above-described first sliding portion 542, the first protrusion 531a and the first sealing portion 561 respectively, and thus, a detailed description thereof will be omitted. Also, the third inclined surface 582b and the fourth inclined surface 582c may be the same as or similar to the above-described first inclined surface 542b and second inclined surface 542c respectively, and thus, a detailed description thereof will be omitted.

The fourth cam 583 may include a fourth insertion portion 583a, a fourth inclined portion 583b, and a fourth seating protrusion 583c, and the fourth insertion portion 583a may include a sixth contact protrusion 583a-1. The fourth insertion portion 583a, the fourth inclined portion 583b, the fourth seating protrusion 583c, and the sixth contact protrusion 583a-1 may be the same as or similar to the above-described second insertion portion 543a, the second inclined portion 543b, the second seating protrusion 543c, and the second contact protrusion 543a-1 respectively, and thus, a detailed description thereof will be omitted.

The second movement reduction portion 584 may include a second frictional force provision portion 584-1 and a second stopper portion 584-2. The second frictional force provision portion 584-1 may include a second contact portion and a second elastic portion, and the second contact portion may include a (2-1)-th contact portion and a (2-2)-th contact portion. Also, the second stopper portion 584-2 may include a (2-1)-th stopper portion 584-2a and a (2-2)-th stopper portion 584-2b. The second frictional force provision portion 584-1 and the second stopper portion 584-2 may be the same as or similar to the first frictional force provision portion 544-1 and the first stopper portion 544-2, respectively.

The hinge assembly 500 may include a distance maintenance portion 590 that is disposed between the first rotation guide portion 540 and the second rotation guide portion 570 and/or between the second rotation guide portion 570 and the third rotation guide portion 580 and maintains a distance between the first rotation guide portion 540 and the second rotation guide portion 570 and/or a distance between the second rotation guide portion 570 and the third rotation guide portion 580.

The distance maintenance portion 590 may have a rib shape, may be formed integrally with or separately from the hinge cover 520, and may be fixed to the hinge cover 520. In another embodiment, the distance maintenance portion 590 may be formed integrally with the internal housing 530 and may be fixed to the hinge cover 520.

During operation of the hinge assembly 500, as described above, the first connection portion 511 and the second connection portion 512 may be connected to the first support portion 430 and the second support portion 440 described with reference to FIG. 4, respectively.

When a user changes (e.g., bends) the display module 900 from an unfolded state to a folded state, one of the first cam 541 and the second cam 543 rotates in a first direction (e.g., one of a clockwise direction and a counterclockwise direction) to move the first sliding portion 542 linearly, and the second sliding portion 582 may apply force to another one of the first cam 541 and the second cam 543 to help rotation in a second direction (e.g., one of a clockwise direction and a counterclockwise direction). In addition, when the user changes (e.g., bends) the display module 900 from the unfolded state to the folded state, one of the third cam 581 and the fourth cam 583 rotates in a second direction (e.g., one of a clockwise direction and a counterclockwise direction) to move the second sliding portion 582 linearly, and the second sliding portion 582 may apply force to another one of the third cam 581 and the fourth cam 583 to rotate it in a first direction (e.g., one of a clockwise direction and a counterclockwise direction). Thus, the first support portion 430 and the second support portion 440, being respectively connected to the first connection portion 511 and the second connection portion 512, may be rotated, and a first cover (see, e.g., the first cover 410 of FIG. 4) and a second cover (see, e.g., the second cover 420 of FIG. 4), which are respectively connected to the first support portion 430 and the second support portion 440, may be rotated.

When the display module 900 is changed (e.g., bent) from the folded state to the unfolded state, the situation may be similar. For example, while one of the first cam 541 and the second cam 543 rotates in the second direction (e.g., one of a clockwise direction and a counterclockwise direction), it may move the first sliding portion 542 linearly, and the first sliding portion 542 may apply force to another one of the first cam 541 and the second cam 543 to rotate it in the first direction (e.g., one of a clockwise direction and a counterclockwise direction). Also, while one of the third cam 581 and the fourth cam 583 rotates in the first direction (e.g., one of a clockwise direction and a counterclockwise direction), it may move the second sliding portion 582 linearly, and the second sliding portion 582 may apply force to another one of the third cam 581 and the fourth cam 583 to rotate it in the second direction (e.g., one of a clockwise direction and a counterclockwise direction). Thus, the first support portion 430 and the second support portion 440, being respectively connected to the first connection portion 511 and the second connection portion 512, may be rotated, and the first cover (see, e.g., the first cover 410 of FIG. 4) and the second cover (see, e.g., the second cover 420 of FIG. 4), which are respectively connected to the first support portion 430 and the second support portion 440, may be rotated.

The operation as described above will be described in additional detail below.

Referring to FIGS. 6 and 7, when a display module (see, e.g., the display module 900 of FIG. 1) is in an unfolded state, the first movement reduction portion 544 may maintain the display module 900 in the unfolded state. For example, when the display module (see, e.g., the display module 900 of FIG. 1) is in the unfolded state, the (1-1)-th contact portion 544-1aa and the (1-2)-th contact portion 544-1ab may be inserted into the (1-2)-th stopper portion 544-2b. In this case, the first elastic portion 544-1b may apply force to the (1-1)-th contact portion 544-1aa and the (1-2)-th contact portion 544-1ab of the first contact portion 544-1a toward the outside of the first protrusion 531a so that the first contact portion 544-1a may not deviate from the (1-2)-th stopper portion 544-2b. Also, as shown in FIG. 6, the (2-1)-th contact portion 584-1aa and the (2-2)-th contact portion 584-1ab may be inserted into the (2-2)-th stopper portion 584-2b. In this case, the second elastic portion 584-1b may apply force to the (2-1)-th contact portion 584-1aa and the (2-2)-th contact portion 584-1ab to the outside so that the (2-1)-th contact portion 584-1aa and the (2-2)-th contact portion 584-1ab may not deviate from the (2-2)-th stopper portion 584-2b.

Referring to FIG. 8, in conjunction with FIGS. 4 and 6, the user may fold the display module 900 from the unfolded state. In this case, at least one of a first connection portion 511 and a second connection portion 512 may rotate so that at least one of the first cam 541 and the third cam 581 may rotate. For example, when the user rotates the first cover 410 while grasping and stopping (or holding) the second cover 420, the first connection portion 511 may be rotated according to rotation of the first cover 410. In this case, the first connection portion 511 may rotate the first cam 541, the first rotation portion 571, and the fourth cam 583. In another embodiment, when the user rotates the second cover 420 while grasping and stopping (or holding) the first cover 410, the second connection portion 512 may be rotated according to rotation of the second cover 420. In this case, the second connection portion 512 may rotate the second cam 543, the second rotation portion 573, and the fourth cam 583. In another embodiment, when the user concurrently (or simultaneously) applies force to the first cover 410 and the second cover 420 with respect to the hinge cover 520, the first connection portion 511 and the second connection portion 512 may rotate so that all of the first cam 541 to the fourth cam 583, the first rotation portion 571, and the second rotation portion 573 may be rotated.

In an embodiment, when the second cover 420 is fixed (or held) and the first cover 410 is rotated so that the first connection portion 511 is rotated, the first cam 541 and the fourth cam 583 may be rotated. For example, when the first cam 541 and the fourth cam 583 are rotated, the first inclined portion 541b may be in contact with the first inclined surface 542b of the first sliding portion 542 to move the first sliding portion 542. For example, the first sliding portion 542 may move linearly in a second direction (e.g., Y-direction of FIG. 8). In this case, the first sliding portion 542 moves linearly and the second inclined surface 542c of the first sliding portion 542 is in contact with the second inclined portion 543b to apply force to the second inclined portion 543b so that the first sliding portion 542 may be slightly rotated.

In the above case, the fourth cam 583 and the second sliding portion 582 may be rotated. In this case, because the second sliding portion 582 is rotated and the third cam 581 is fixed, force may be applied to the third inclined surface 582b by the inclined surface of the third cam 581 so that the second sliding portion 582 may move linearly with respect to the second protrusion 533a. In this case, the second sliding portion 582 may move linearly in an opposite direction to the first sliding portion 542.

In another embodiment, the above description may be applied to when the first cover 410 is fixed (or held) and force is applied to the second cover 420 to rotate the second cover 420 to fold the display module 900 from an unfolding state. For example, when force is applied to the second cover 420, the second cover 420 may apply force to the second connection portion 512, and the second cam 543 and the third cam 581 may be rotated according to the rotation of the second connection portion 512. In this case, due to rotation of the third cam 581, the second sliding portion 582 may move linearly, and the second frictional force provision portion 584-1 may operate similarly to the first frictional force provision portion 544-1 described above. In this case, the second sliding portion 582 may move in an opposite direction to the second direction. In this case, the second sliding portion 582 may apply force to the fourth cam 583 to rotate along the inclined surface of the first cam 541. Also, the second cam 543 may rotate together with the second connection portion 512 and a limitation imposed by the second cam 543 may be released so that the second sliding portion 582 may rotate together according to rotation of the first sliding portion 542. In this case, the first inclined surface 542b of the first sliding portion 542 may be forced by the inclined surface of the first cam 541 while climbing along the inclined surface of the first cam 541. In this case, the first sliding portion 542 may move linearly in a second direction. In this case, the user may rotate only the second cover 420 with a small force so that the display module 900 may be changed from the unfolded state to the folded state.

In another embodiment, as shown in FIG. 8, the first connection portion 511 and the second connection portion 512 may be concurrently (or simultaneously) rotated. In this case, the first cam 541 and the second cam 543 may be concurrently (or simultaneously) rotated. In this case, the first cam 541 and the second cam 543 may be rotated in opposite directions. In this case, by applying force to the first inclined surface 542b, the inclined surface of the first cam 541 may move the first sliding portion 542 linearly in the second direction. In this case, the second cam 543 may rotate while being in contract with the second inclined surface 542c so that a space in which the second inclined surface 542c may move may be provided.

In the above case, the second sliding portion 582 may move similarly to the first sliding portion 542. For example, the third cam 581 may rotate in the same direction as the second cam 543, and the fourth cam 583 may be rotated in the same direction as the first cam 541. In this case, due to rotation of the third cam 581, a protruding portion of the inclined surface of the third cam 581 and a protruding portion of the third inclined surface 582b may meet each other so that the third cam 581 may apply force to the second sliding portion 582 in an opposite direction to the second direction. In this case, the fourth cam 583 may rotate in an opposite direction to the third cam 581 so that the movement of the second sliding portion 582 may not be impeded.

While rotating as described above, the first contact protrusion 541a-1 may be in contact with at least one of the internal housing 530 and the first shaft 545 to reduce the rotation speed of the first cam 541. Also, the second contact protrusion 543a-1 may be in contact with at least one of the internal housing 530 and the second shaft 546 to reduce the rotation speed of the second cam 543.

In addition, in the above case, the first sealing portion 561 described with reference to FIG. 6 may impede the movement of the first sliding portion 542. In addition, while the first sliding portion 542 moves linearly, the (1-1)-th contact portion 544-1aa and the (1-2)-th contact portion 544-1ab may be in contact with an inner wall of the first guide groove 542a disposed between the (1-1)-th stopper portion 544-2a and the (1-2)-th stopper portion 544-2b. In this case, the first elastic portion 544-1b, in a compressed state, may apply force to the (1-1)-th contact portion 544-1aa and the (1-2)-th contact portion 544-1ab toward the outside of the first protrusion 531a. Thus, while the first sliding portion 542 moves linearly, the speed by which it moves may be reduced.

Also, each of the third contact protrusion 571a and the fourth contact protrusion 573a may provide a frictional force to corresponding one of the first rotation portion 571 and the second rotation portion 573.

Hereinafter, for convenience of explanation, an embodiment in which all of the first connection portion 511 and the second connection portion 512 are rotated and the display module 900 is maintained in a folded state will be described in detail.

Referring to FIGS. 1 and 9, in conjunction with FIG. 6, when the display module 900 reaches the folded state, the first sliding portion 542 may almost reach the end of the first guide groove 542a. In this case, the most protruding part of the first inclined portion 541b and the most protruding part of the first inclined surface 542b of the first sliding portion 542 may be in contact with each other, and the most non-protruding part (or most inserted part) of the second inclined portion 543b and the most non-protruding part of the second inclined surface 542c of the first sliding portion 542 may be in contact with each other. Also, the most protruding part of the third inclined portion 581b and the most protruding part of the second inclined surface 542c may be in contact with each other, and the most non-protruding part of the fourth inclined portion 583b and the most non-protruding part of the fourth inclined surface 582c may be in contact with each other.

The (1-1)-th contact portion 544-1aa and the (1-2)-th contact portion 544-1ab may be inserted into the (1-1)-th stopper portion 544-2a. In this case, the first elastic portion 544-1b may be in an uncompressed state or in a slightly compressed state with respect to an initial length. The (2-1)-th contact portion 584-1aa and the (2-2)-th contact portion 584-1ab may be inserted into the (2-1)-th stopper portion 584-2a. In this case, the second elastic portion 584-1b may be in an uncompressed state or in slightly compressed state.

As described above, the electronic device is described as being changeable (e.g., foldable) from an unfolded state to a folded state, but the electronic device may be changeable (e.g., unfoldable) from the folded state to the unfolded state in a similar manner. For example, when the electronic device is changed (e.g., is unfolded) from the folded state to the unfolded state, in FIG. 9, the hinge assembly 500 may reach the configuration shown in FIG. 7 via the intermediate configuration shown in FIG. 8.

When the electronic device is changed from the folded state to the unfolded state or from the unfolded state to the folded state, at least one of the first contact protrusion 541a-1, the second contact protrusion 543a-1, the (1-1)-th contact portion 544-1aa, the (1-2)-th contact portion 544-1ab, the third contact protrusion 571a, the fourth contact protrusion 573a, the fifth contact protrusion 581a-1, the sixth contact protrusion 583a-1, the (2-1)-th contact portion 584-1aa, the (2-2)-th contact portion 584-1ab, the first sealing portion 561, and the second sealing portion 562 may provide a frictional force. For example, in the electronic device, even when one of the first contact protrusion 541a-1, the second contact protrusion 543a-1, the (1-1)-th contact portion 544-1aa, the (1-2)-th contact portion 544-1ab, the third contact protrusion 571a, the fourth contact protrusion 573a, the fifth contact protrusion 581a-1, the sixth contact protrusion 583a-1, the (2-1)-th contact portion 584-1aa, the (2-2)-th contact portion 584-1ab, the first sealing portion 561, and the second sealing portion 562 is worn out or damaged and does not provide (or does not fully provide) the above-described frictional force, another one of the first contact protrusion 541a-1, the second contact protrusion 543a-1, the (1-1)-th contact portion 544-1aa, (1-2)-th contact portion 544-1ab, the third contact protrusion 571a, the fourth contact protrusion 573a, the fifth contact protrusion 581a-1, the sixth contact protrusion 583a-1, the (2-1)-th contact portion 584-1aa, the (2-2)-th contact portion 584-1ab, the first sealing portion 561, and the second sealing portion 562 may provide the above-described frictional force. For example, when a component of a conventional hinge is worn out or damaged, the shape of a corresponding electronic device may be rapidly changed from an unfolded state to a folded state or from the folded state to the unfolded state, which may injure the user. However, when the electronic device including the hinge assembly 500 according to embodiments of the present disclosure is changed as described above, various components of the hinge assembly 500 provide a frictional force so that the above-described problems may not occur even if one or more components thereof is worn out or damaged.

Also, the electronic device may be maintained in the unfolded state or in the folded state. For example, the (1-1)-th contact portion 544-1aa and the (1-2)-th contact portion 544-1ab of the electronic device may be maintained in the unfolded state or folded state so that the user's convenience may be increased and damage of the display module may be prevented.

In the hinge assembly and the electronic device according to embodiments of the present disclosure, the shape of the electronic device may be maintained in a folded state and an unfolded state.

Also, in the hinge assembly and the electronic device according to embodiments of the present disclosure, when the electronic device is changed to the folded state from the unfolded state, rapid unfolding of the electronic device may be prevented.

It should be understood that the embodiments described herein should be considered in a descriptive sense and not for purposes of limitation. Descriptions of features and aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the attached claims and their equivalents.

What is claimed is:

1. A hinge assembly comprising:
 a rotatable first cam;
 a rotatable second cam facing the first cam;
 a sliding portion in contact with the first cam and the second cam and configured to move linearly, in a first direction extending toward the first cam and the second cam, when at least one of the first cam or the second cam is rotated; and
 a movement reduction portion in contact with the sliding portion and configured to resist linear movement of the sliding portion by applying a variable force in a second direction crossing the first direction.

2. The hinge assembly of claim 1, wherein a portion at where the first cam and the sliding portion contact each other and a portion at where the second cam and the sliding portion contact each other are inclined.

3. The hinge assembly of claim 1, further comprising an internal housing configured to guide linear movement of the sliding portion.

4. The hinge assembly of claim 3, wherein the internal housing comprises a guide protrusion inserted into the sliding portion, and
 wherein the sliding portion has a groove through which the guide protrusion is inserted into the sliding portion.

5. The hinge assembly of claim 4, further comprising a sealing portion inside the groove.

6. The hinge assembly of claim 3, further comprising first and second shaft portions on the internal housing and in contact with the first cam and the second cam.

7. The hinge assembly of claim 6, wherein the first shaft portion is inserted into the first cam, and
 wherein the second shaft portion is inserted into the second cam.

8. The hinge assembly of claim 3, wherein the movement reduction portion comprises:
 a contact portion on the internal housing and configured to contact the sliding portion when the sliding portion moves linearly; and
 an elastic portion on the internal housing and configured to apply force to the contact portion toward the sliding portion.

9. The hinge assembly of claim 8, wherein the contact portion comprises:
 a first contact portion; and
 a second contact portion facing in an opposite direction to the first contact portion with respect to the elastic portion.

10. The hinge assembly of claim 8, further comprising a stopper portion into which the movement reduction portion is inserted and configured to limit movement of the sliding portion.

11. The hinge assembly of claim 10, wherein the stopper portion comprises
 a first stopper portion; and
 a second stopper portion spaced apart from the first stopper portion.

12. The hinge assembly of claim 1, wherein at least one of the first cam and the second cam comprises a contact protrusion protruding toward an outer surface.

13. An electronic device comprising:
 a first case;
 a second case separated from the first case;
 a hinge assembly connecting the first case and the second case to each other; and
 a display panel configured to be foldable with respect to the first case, the second case, and the hinge assembly,
 wherein the hinge assembly comprises:
  a rotatable first cam;
  a rotatable second cam facing the first cam;
  a sliding portion in contact with the first cam and the second cam and configured to move linearly, in a first direction extending toward the first cam and the second cam, when at least one of the first cam or the second cam is rotated; and
  a movement reduction portion in contact with the sliding portion and configured to resist linear movement of the sliding portion by applying a variable force in a second direction crossing the first direction.

14. The electronic device of claim 13, wherein a portion at where the first cam and the sliding portion contact each other and a portion at where the second cam and the sliding portion contact each other are inclined.

15. The electronic device of claim 13, wherein the hinge assembly further comprises an internal housing configured to guide linear movement of the sliding portion.

16. The electronic device of claim 15, wherein the internal housing comprises a guide protrusion inserted into the sliding portion, and
 wherein the sliding portion has a groove through which the guide protrusion is inserted into the sliding portion.

17. The electronic device of claim 15, wherein the movement reduction portion comprises:
 a contact portion on the internal housing and configured to contact the sliding portion when the sliding portion moves linearly; and
 an elastic portion on the internal housing and configured to apply force to the contact portion toward the sliding portion.

18. The electronic device of claim 17, wherein the contact portion comprises:
 a first contact portion; and
 a second contact portion arranged in an opposite direction to the first contact portion with respect to the elastic portion.

19. The electronic device of claim 13, wherein the hinge assembly further comprises a stopper portion into which the movement reduction portion is inserted and configured to limit movement of the sliding portion.

20. The electronic device of claim 19, wherein the stopper portion comprises:
 a first stopper portion; and
 a second stopper portion spaced apart from the first stopper portion.

* * * * *